US010452726B2

United States Patent
Dong

(10) Patent No.: US 10,452,726 B2
(45) Date of Patent: Oct. 22, 2019

(54) IN-NETWORK SEMANTIC MASHUP FOR AN INFORMATION-CENTRIC NETWORKING (ICN) NETWORK

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 192 days.

(21) Appl. No.: 15/724,813

(22) Filed: Oct. 4, 2017

(65) Prior Publication Data

US 2019/0073419 A1 Mar. 7, 2019

Related U.S. Application Data

(60) Provisional application No. 62/555,389, filed on Sep. 7, 2017.

(51) Int. Cl.

| G06F 7/00 | (2006.01) |
|---|---|
| G06F 16/951 | (2019.01) |
| G06F 16/2455 | (2019.01) |
| H04L 29/08 | (2006.01) |
| G06F 16/957 | (2019.01) |

(52) U.S. Cl.
CPC ...... G06F 16/951 (2019.01); G06F 16/24553 (2019.01); G06F 16/957 (2019.01); H04L 67/00 (2013.01)

(58) Field of Classification Search
CPC .................................................. G06F 16/951
See application file for complete search history.

(56) References Cited

U.S. PATENT DOCUMENTS

| 2014/0337372 A1* | 11/2014 | Lee ............................ G06F 8/30 |
| | | 707/767 |
| 2015/0370900 A1* | 12/2015 | Song ..................... G06F 16/951 |
| | | 707/770 |

* cited by examiner

*Primary Examiner* — Ajith Jacob
(74) *Attorney, Agent, or Firm* — Fish & Richardson P.C.

(57) ABSTRACT

A method of performing semantic mashup in an information-centric networking (ICN) network includes receiving, at a router, a data request message. The data request message includes at least a name of targeted data, a name of low-level data, and a semantic mashup logic for generating the targeted data using the low-level data. In response to determining that the targeted data is not stored at the router and that the low-level data is stored at the router, the router generates the targeted data using the low-level data based on the semantic mashup logic. The router also generates a data response message. The data response message includes the generated targeted data.

20 Claims, 14 Drawing Sheets

IN-NETWORK SEMANTIC MASHUP FOR AN INFORMATION-CENTRIC NETWORKING (ICN) NETWORK

CROSS REFERENCE TO RELATED APPLICATIONS

This application claims priority to U.S. Application Ser. No. 62/555,389, filed on Sep. 7, 2017, the entire contents of each which are hereby incorporated by reference.

TECHNICAL FIELD

This disclosure relates to semantic mashup operations in a computer network.

BACKGROUND

Information-Centric Networking (ICN) architectures are emerging architectures for future computer networks, such as future Internet. Different from traditional IP address-centric architectures which retrieve contents based on server IP addresses, ICN architectures retrieve contents based on content names (e.g., name-based routing).

SUMMARY

The present disclosure describes in-network semantic mashup for an information-centric networking (ICN) network.

In a first implementation, a method for performing semantic mashup includes receiving, at a router, a data request message. The data request message includes at least a name of targeted data, a name of low-level data, and a semantic mashup logic for generating the targeted data using the low-level data. In response to determining that the targeted data is not stored at the router and that the low-level data is stored at the router, the router generates the targeted data using the low-level data based on the semantic mashup logic. The router also generates a data response message. The data response message includes the generated targeted data. In some cases, the router can store the targeted data, the semantic mashup logic, or both. The semantic mashup logic can include a mathematical formula for generating the targeted data using the low-level data.

In some cases, the router also receives a second data request message. The second data request message includes at least a name of second targeted data, a name of second low-level data, a second semantic mashup logic for generating the second targeted data based on the second low-level data. In response to determining that the second targeted data and the second low-level data are not stored at the router, that the name of the second targeted data and the name of the second low-level data are not presented in a pending interest table (PIT), that the name of the second targeted data is not presented in a data routing table, and that the name of the second low-level data is presented in the data routing table, the router generates a new data request message including at least the name of the second low-level data and an identification of the second data request message. The router also generates a PIT entry, where the PIT entry includes at least the name of the second targeted data, the identification of the second data request message, and an identification of the new data request message. The router then includes the PIT entry in the PIT. The router stores the data routing table and the PIT. After generating the new data request message, the router receives a second data response message. The second data response message includes at least the identification of the second data request message, the identification of the new data request message, and the second low-level data. In response to determining that the identification of the new data request message in the second data response message matches the identification of the new data request message in the PIT entry, and that the identification of the second data request message in the second data response message matches the identification of the second data request message in the PIT entry, the router removes the PIT entry from the PIT. After receiving the second data response message, the router generates the second targeted data using the second low-level data received in the second data response message based on the second semantic mashup logic. The router also generates a third data response message, where the third data response message includes the second targeted data.

In a second implementation, a router includes a memory storing instructions, and one or more hardware processors in communication with the memory. The one or more hardware processors execute the instructions to receive a data request message. The data request message includes at least a name of targeted data, a name of low-level data, and a semantic mashup logic for generating the targeted data using the low-level data. In response to determining that the targeted data is not stored at the router and that the low-level data is stored at the router, the router generates the targeted data using the low-level data based on the semantic mashup logic. The router also generates a data response message. The data response message includes the generated targeted data. In some cases, the router can store the targeted data, the semantic mashup logic, or both. The semantic mashup logic can include a mathematical formula for generating the targeted data using the low-level data.

In some cases, the one or more hardware processors also receive a second data request message. The second data request message includes at least a name of second targeted data, a name of second low-level data, a second semantic mashup logic for generating the second targeted data based on the second low-level data. In response to determining that the second targeted data and the second low-level data are not stored at the router, that the name of the second targeted data and the name of the second low-level data are not presented in a PIT, that the name of the second targeted data is not presented in a data routing table, and that the name of the second low-level data is presented in the data routing table, the router generates a new data request message including at least the name of the second low-level data and an identification of the second data request message. The router also generates a PIT entry, where the PIT entry includes at least the name of the second targeted data, the identification of the second data request message, and an identification of the new data request message. The router then includes the PIT entry in the PIT. The router stores the data routing table and the PIT. After generating the new data request message, the router receives a second data response message. The second data response message includes at least the identification of the second data request message, the identification of the new data request message, and the second low-level data. In response to determining that the identification of the new data request message in the second data response message matches the identification of the new data request message in the PIT entry, and that the identification of the second data request message in the second data response message matches the identification of the second data request message in the PIT entry, the router removes the PIT entry from the PIT. After receiving the second data response message, the router generates the second targeted data using the second low-level data received in the second data response message based on the second semantic mashup logic. The router also generates a third data response message, where the third data response message includes the second targeted data.

In a third implementation, a non-transitory computer-readable medium storing computer instructions, that when executed by one or more hardware processors, cause the one or more hardware processors of a router to perform operations that include receiving a data request message. The data request message includes at least a name of targeted data, a name of low-level data, and a semantic mashup logic for generating the targeted data using the low-level data. In response to determining that the targeted data is not stored at the router and that the low-level data is stored at the router, the router generates the targeted data using the low-level data based on the semantic mashup logic. The router also generates a data response message. The data response message includes the generated targeted data.

In some cases, the operations also include receiving a second data request message. The second data request message includes at least a name of second targeted data, a name of second low-level data, a second semantic mashup logic for generating the second targeted data based on the second low-level data. In response to determining that the second targeted data and the second low-level data are not stored at the router, that the name of the second targeted data and the name of the second low-level data are not presented in a PIT, that the name of the second targeted data is not presented in a data routing table, and that the name of the second low-level data is presented in the data routing table, the router generates a new data request message including at least the name of the second low-level data and an identification of the second data request message. The router also generates a PIT entry, where the PIT entry includes at least the name of the second targeted data, the identification of the second data request message, and an identification of the new data request message. The router then includes the PIT entry in the PIT. After generating the new data request message, the router receives a second data response message. The second data response message includes at least the identification of the second data request message, the identification of the new data request message, and the second low-level data. In response to determining that the identification of the new data request message in the second data response message matches the identification of the new data request message in the PIT entry, and that the identification of the second data request message in the second data response message matches the identification of the second data request message in the PIT entry, the router removes the PIT entry from the PIT. After receiving the second data response message, the router generates the second targeted data using the second low-level data received in the second data response message based on the second semantic mashup logic. The router also generates a third data response message, where the third data response message includes the second targeted data.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
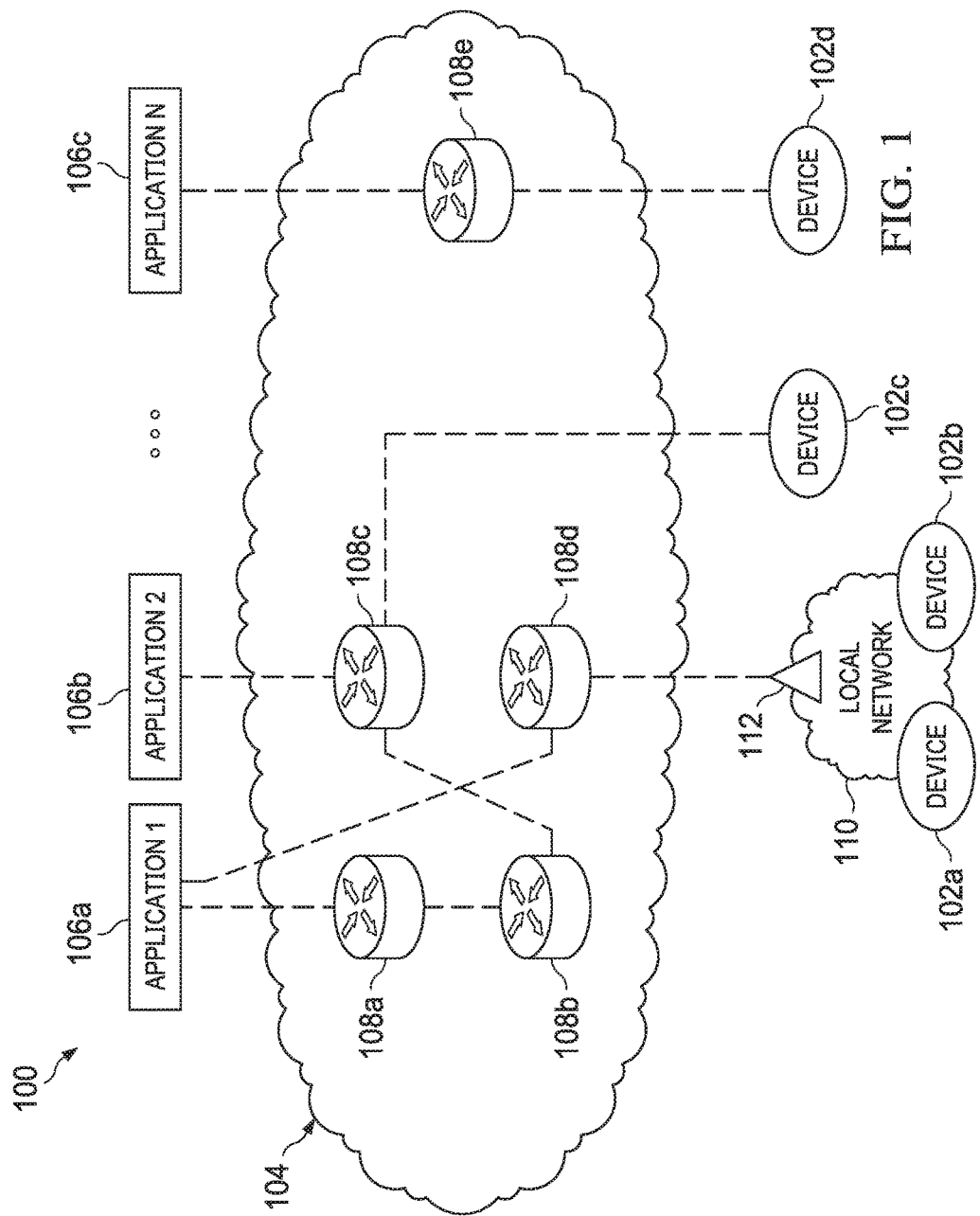
FIG. 1 is an example communication system that includes information-centric networking (ICN) routers performing semantic mashup, according to an implementation.

The following detailed description describes in-network semantic mashup operations for an information-centric networking (ICN) network, i.e., a network using an ICN architecture, and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

ICN architectures can be suitable for networks that include a large number of machine-to-machine (M2M) or Internet of Things (IoT) devices. M2M or IoT devices can be devices, such as sensors or meters, that measure or collect information and share the information across the network. Using name-based routing, ICN architectures can efficiently disseminate information collected by the large number of M2M or IoT devices.

Semantic mashup is a method of generating new data from one or more data sources based on semantic descriptions that describe how to generate the new data from the one or more data sources. Existing IoT (or M2M) systems do not efficiently support semantic mashup. An IoT system can include IoT devices collecting data, IoT applications using the data from the IoT devices, and a network distributing the data from the IoT devices to the IoT applications. For example, IoT devices such as surveillance video cameras can be installed along roads for collecting traffic videos. If an IoT application on a mobile device wants to calculate a travel time between two locations, the IoT application can request the corresponding traffic videos, analyze the videos, and calculate the travel time based on semantic mashup. In this case, the semantic mashup is performed out-of-network (for example, at the mobile device) and a large amount of network bandwidth is used to transport the traffic videos from the video cameras to the mobile device. In addition, the mashup result (for example, the calculated travel time) is stored at the mobile device which cannot be reused by other mobile devices. In some cases, the semantic mashup may not even be performed if the mobile device does not have the tools (for example, the tool for analyzing the traffic videos) or processing power for the semantic mashup.

In some implementations, support for semantic mashup in the IoT systems can be improved by making use of routers' in-network caching and processing capabilities. For example, when a traffic video is transported from a video camera to a mobile device through one or more intermediate routers, the intermediate routers can store the traffic video. A next time when another mobile device requests the same traffic video, a router near the requesting mobile device can provide the traffic video without wasting network bandwidths to transport the traffic video from the video camera. In some cases, after a router stores a traffic video, the router can perform the semantic mashup on the traffic video and store the mashup result. A next time when a mobile device requests the same mashup result, the router can provide the mashup result without wasting the mobile device's processing power to perform the mashup operation.

At a high level, the described approach provides efficient in-network semantic mashup operations using routers' embedded caching and processing capabilities. For an IoT system, semantic mashup can create virtual IoT devices providing "virtual data" from the semantic mashup. The "virtual data" can be searched or discovered in the IoT system similarly as "physical data" that is measured or collected by physical IoT devices (such as sensors or meters). With the embedded caching and processing capabilities, the routers can perform semantic mashup, store the mashup results, and become virtual IoT devices. The data stored at the routers can be reused by different IoT applications and other routers.

For supporting efficient data dissemination, an ICN architecture can be used for the IoT system so that data is retrieved based on data names. In other words, routers that support the ICN architecture (also called ICN routers) can be used in the IoT system. However, existing ICN architectures do not support semantic mashup. As a result, existing ICN architectures can be enhanced to support semantic mashup. For example, various ICN messages, such as data request messages and data response messages, can be enhanced to include information related to semantic mashup.

The in-network semantic mashup for an ICN network described herein can efficiently disseminate data across an IoT system using reduced network bandwidths. Routers' caching and processing capabilities enable the routers to perform semantic mashup at multiple levels and store the mashup data. The described approach can save network bandwidths because IoT applications can retrieve mashup data from nearby routers instead of transporting raw IoT data from IoT devices to IoT applications. The described approach can also save processing powers for user devices, because the user devices can retrieve mashup data directly from the routers instead of the user devices performing the semantic mashup. The described approach enables the semantic mashup to be performed in a distributed manner by different routers, instead of in a centralized manner by one network node in some existing systems. The described approach also enables efficient data retrieval because the routers have intelligence in forwarding data request messages and data response messages.

FIGS. 1-14 and associated descriptions provide additional details of the described approach. Although in the following description, an IoT system is used as an example, as will be understood by those of ordinary skill in the art, the described approach can also be used for other systems that perform semantic mashup.

FIG. 1 is an example communication system 100 that includes ICN routers performing semantic mashup, according to an implementation. The example communication system 100 can include devices 102a-102d connected to a network 104, and applications 106a-106c that can request data from the network 104. The network 104 can include routers 108a-108e that transport data from the devices 102a-102d to the applications 106a-106c. The devices 102a-102d can be physical IoT devices that measure or collect data, such as video camera, sensor, meter, portable gaming device, wearable electronic device, test equipment, gambling machine, vehicle, notice board, home appliance, or the like. The applications 106a-106c can be IoT applications installed on user devices such as mobile device, portable electronic device, computers, laptop, portable gaming device, wearable electronic device, test equipment, gambling machine, vehicle, notice board, home appliance, or the like. In some cases, a device can be an IoT device collecting data and also have an IoT application installed to use data collected by other IoT devices. The routers 108a-108e can retrieve data from the device 102a-102d. The applications 106a-106c can send data request messages to the routers 108a-108e for requesting data. In some cases, devices such as 102a-102b can be connected to the network 104 through a local network 110 and a gateway 112.

The network 104 is a network using an ICN architecture. The network 104 can use various ICN architectures, for example, Data-Oriented Network Architecture (DONA), Publish Subscribe Internet Technology (PURSUIT), Scalable and Adaptive Internet Solutions (SAIL), and Named Data Networking (NDN). In the illustrated example, NDN is used. The routers 108a-108e are ICN routers supporting the ICN architecture. The routers 108a-108e have storage and processing capabilities for in-network caching and processing. With in-network caching, the routers 108a-108e can perform semantic mashup on the cached data to become virtual IoT devices and virtual data sources. The semantic mashup can be carried out opportunistically after a data request message is received at the network 104, leveraging the cached data as well as the intelligent name-based routing provided by the routers 108*a*-108*e*.

Figure 5:
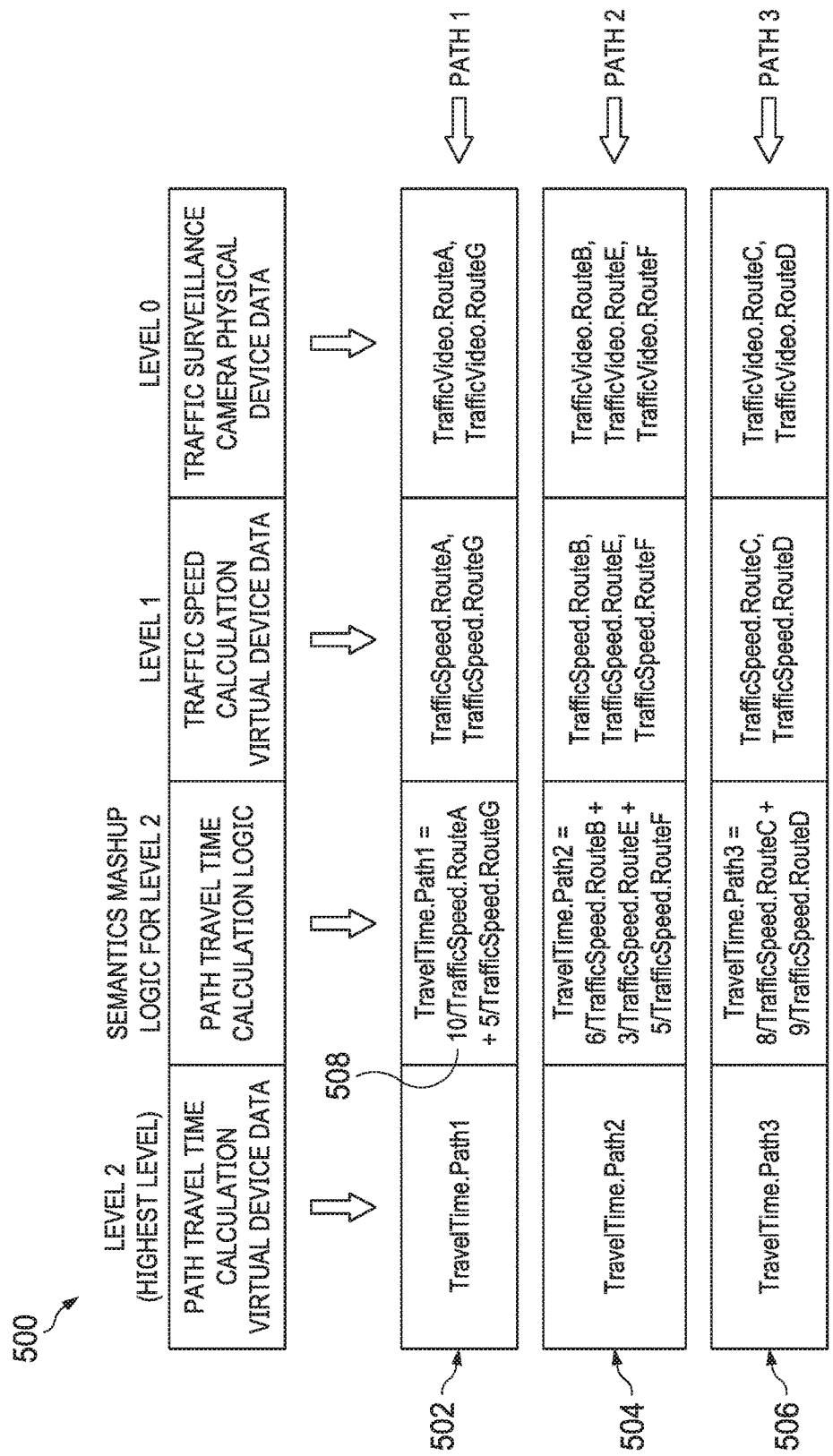
FIG. 5 illustrates a first set of example data request messages when data names are fully known, according to an implementation.

For example, when the application 106*a* wants to know a travel time between two locations, the application 106*a* can send a data request message to the network 104. As will be discussed more below in Table 1, the data request message can include a name of targeted data (i.e., data requested by the data request message, e.g., travel time data), name(s) of one or more low-level data (e.g., traffic speed data) that can be used to generate the targeted data, and one or more semantic mashup logics (SMLs) describing how to generate the targeted data using the one or more low-level data. For example, as shown in FIG. 5 below, the SML can be a mathematical formula for generating the travel time data using the traffic speed data. In some cases, the SML can be a tool, for example, an analysis tool that derives traffic speeds by analyzing traffic videos. For example, the analysis tool can use object recognition techniques to identify vehicles in the video and track the vehicles across multiple video frames to calculate an average traffic speed. In some implementations, the tool can be configured in the router by installing the tool in the router. In some implementations, the tool can be configured in the router, for example, by including a link to the tool in the router so that the router can download the tool to perform semantic mashup.

After a router, for example, router 108*a*, receives the data request message, the router 108*a* first determines if the targeted data is stored at the router 108*a*. If the router 108*a* has the travel time data, the router 108*a* replies to the application 106*a* with the travel time data. If the router 108*a* does not have the targeted data, the router 108*a* determines if any of the one or more low-level data stored at the router 108*a*. For example, if the router 108*a* has the traffic speed data, the router 108*a* can generate the travel time data using the SML in the data request message, and send the mashup result to the application 106*a*.

If the router 108*a* does not have any of the low-level data, based on information in the router 108*a* (e.g., a routing table), the router 108*a* can determine if other routers have the low-level data, and send a new data request message to another router requesting the low-level data. For example, the new data request message can include a name of targeted data (i.e., data requested by this new data request message, e.g., traffic speed data). In some cases, the new data request message can also include the name of the data that the application 106*a* originally asks for (i.e., the travel time data, also called ultimately targeted data) in case the other router happens to have the ultimately targeted data. After the router 108*a* receives the traffic speed data from the other router, the router 108*a* can use semantic mashup to generate the travel time data and reply to the application 106*a*. The router 108*a* can also store the received low-level data for further use. In some cases, after the router 108*a* generates the mashup results, the router 108*a* can store the mashup results and notify other routers so that the mashup results can be reused by other routers.

Figure 2:
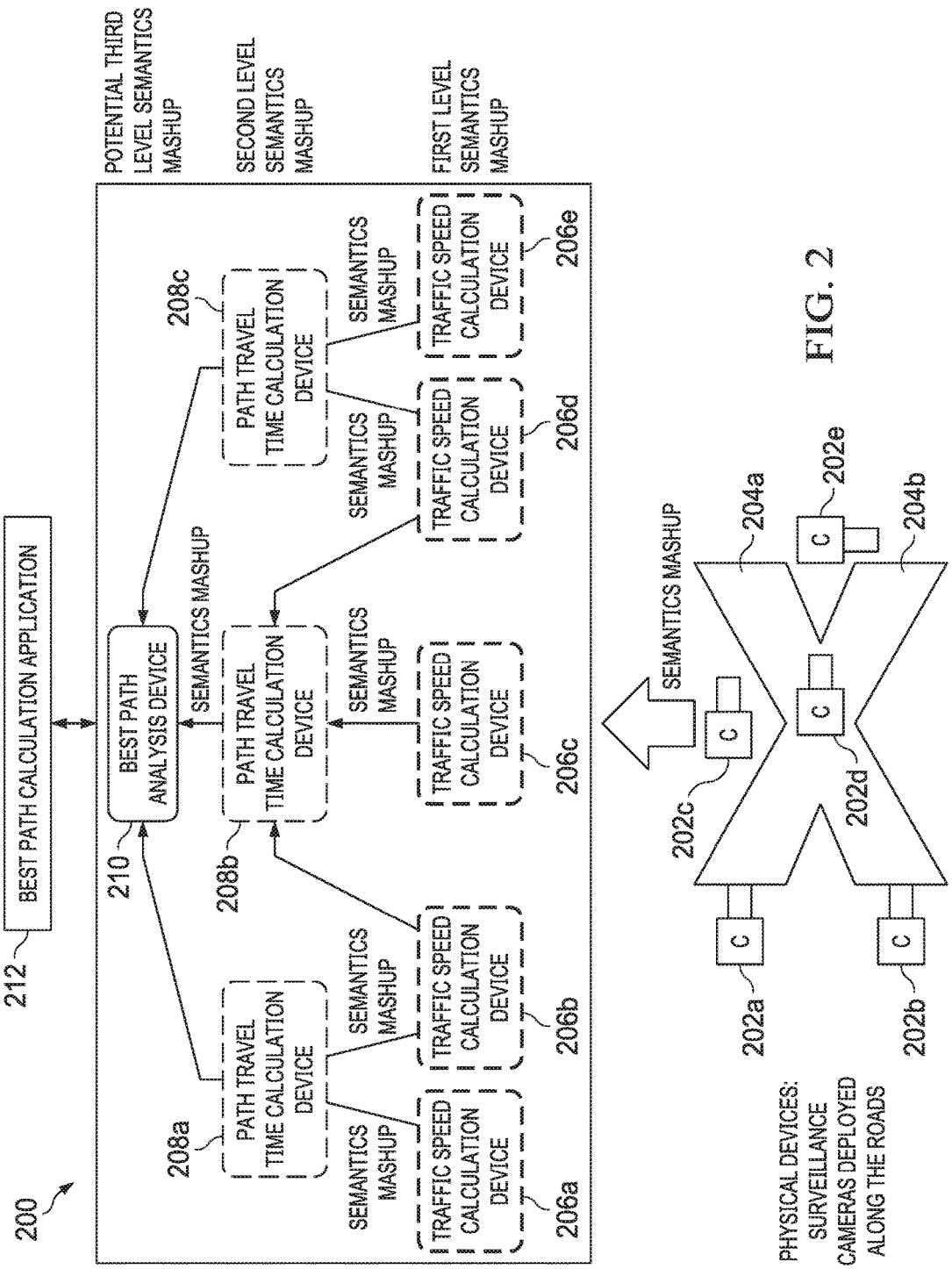
FIG. 2 illustrates an example user case for semantic mashup, according to an implementation.

FIG. 2 illustrates an example user case 200 for semantic mashup, according to an implementation. The example user case 200 can include physical IoT devices 202*a*-202*e* that are surveillance cameras deployed along roads 204*a*-204*b* for collecting traffic videos, and virtual IoT devices such as traffic speed calculation devices 206*a*-206*e*, path travel time calculation devices 208*a*-208*c*, and a best path analysis device 210. As discussed above, any of the virtual IoT devices 206*a*-206*e*, 208*a*-208*c*, and 210 can be implemented by one or more routers 108*a*-108*e* in FIG. 1 using the routers' caching and processing capabilities. The virtual traffic speed calculation devices 206*a*-206*e* can perform a first level semantic mashup. For example, based on the traffic videos collected by the surveillance camera devices 202*a*-202*e*, the virtual traffic speed calculation devices 206*a*-206*e* can produce and publish derived data such as number of vehicles that passed during the last minute or hour, and average speeds of vehicles. The virtual path travel time calculation devices 208*a*-208*c* can perform a second level semantic mashup. For example, based on the speed data provided by the virtual traffic speed calculation devices 206*a*-206*e*, the virtual path travel time calculation devices 208*a*-208*c* can produce and publish an average travel time from a source to a destination. The virtual best path analysis device 210 can perform a third level semantic mashup. For example, the virtual best path analysis device 210 can analyze a best path among a number of available paths from a source to a destination based on the path travel times calculated by the virtual path travel time calculation devices 208*a*-208*c*. The virtual best path analysis device 210 can provide the path result to a best path calculation application 212.

Although the user case 200 shows three levels of semantic mashup, more than three levels of mashup can be used. In some cases, a router can act as multiple virtual IoT devices. For example, if a router can perform both speed calculation from the traffic videos and travel time calculation from the traffic speed, then the router acts as both the virtual traffic speed calculation device and the virtual path travel time calculation device.

Figure 3:
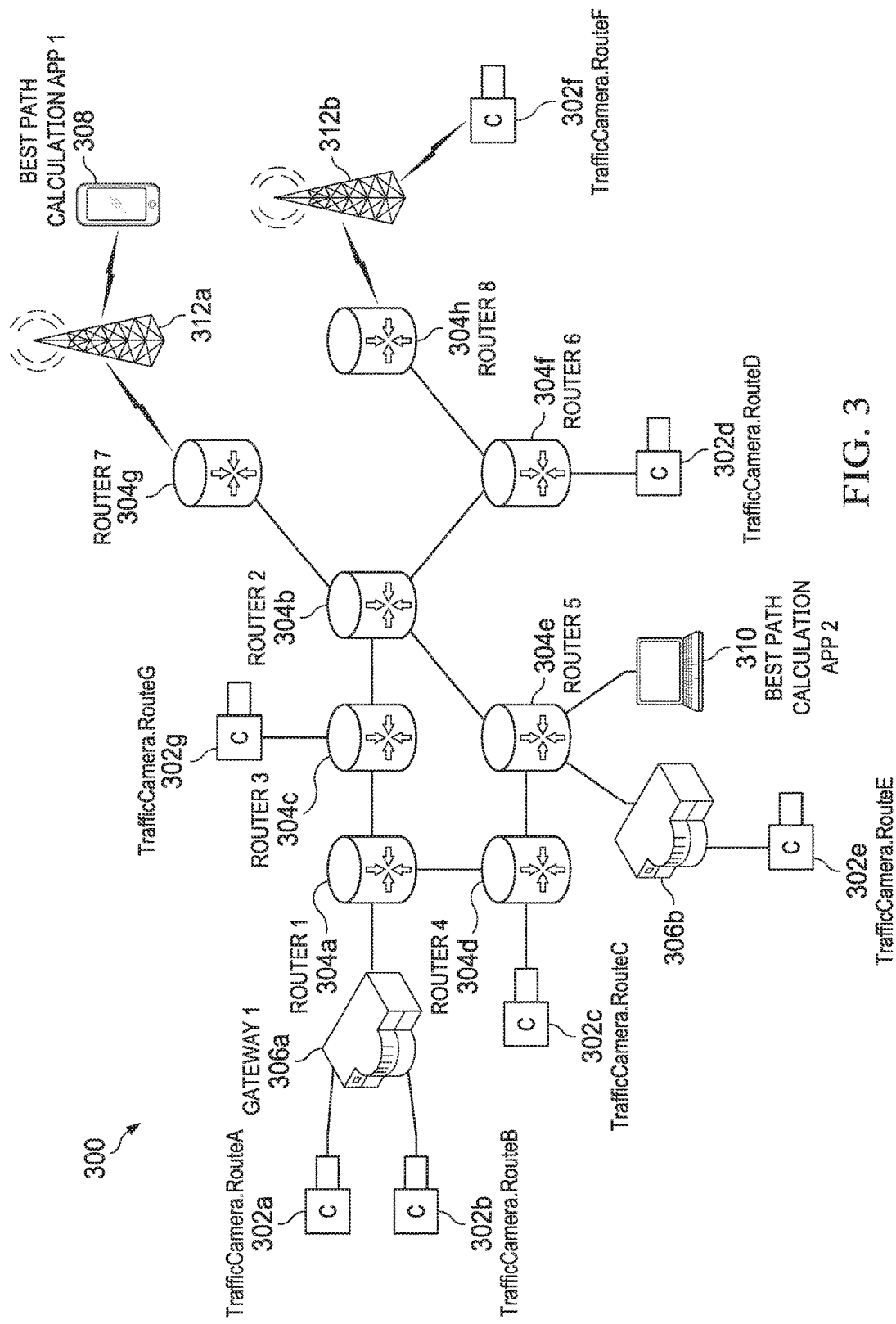
FIG. 3 illustrates an example network topology for semantic mashup, according to an implementation.

FIG. 3 illustrates an example network topology 300 for semantic mashup, according to an implementation. The network topology 300 can include physical IoT devices 302*a*-302*g* such as surveillance cameras deployed on routes A-G and connected to routers 304*a*-304*h*, and IoT applications such as best path calculation apps 308 and 310. In some cases, the physical devices can connect to the routers through gateways. For example, the physical devices 302*a*-302*b* are connected to the router 304*a* through a gateway 306*a*, while the physical device 302*e* is connected to the router 304*e* through a gateway 306*b*. In some cases, the physical devices can connect to the routers through wireless connections, wired connections, or a combination of both. For example, the physical device 302*f* is connected to the router 304*h* through a wireless base station 312*b*. The IoT applications 308 and 310 can be installed on user devices, such as a mobile phone or a computer. The IoT applications can connect to the routers 304*a*-304*h* through wireless connections, wired connections, or a combination of both. For example, the best path calculation app 308 is connected to the router 304*g* through a wireless base station 312*a*.

Figure 4:
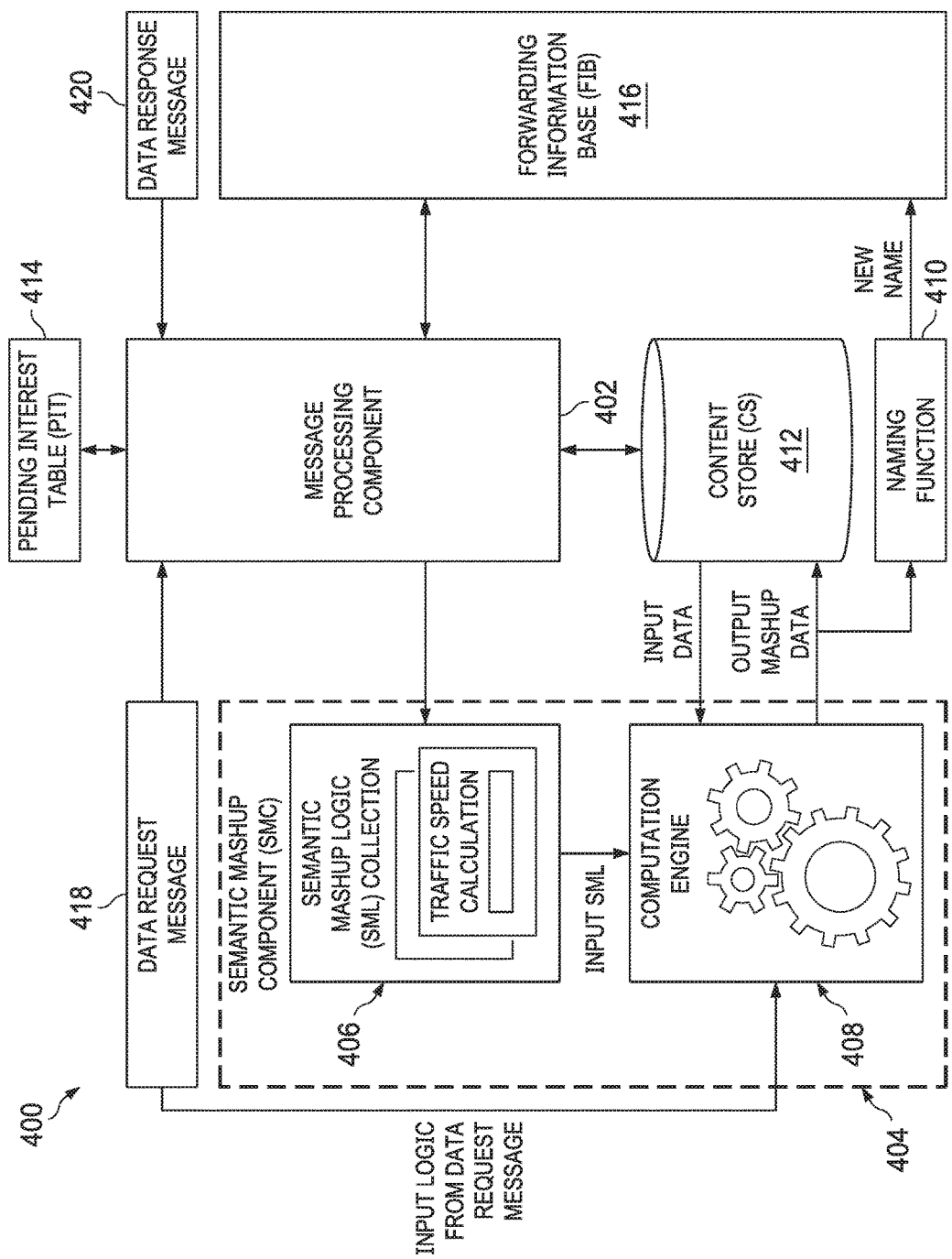
FIG. 4 illustrates an example ICN router that performs semantic mashup, according to an implementation.

FIG. 4 illustrates an example ICN router 400 that performs semantic mashup, according to an implementation. The example ICN router 400 can include a message processing component 402, a semantic mashup component (SMC) 404, a naming function 410, a content store (CS) 412, a pending interest table (PIT) 414, and a forwarding information base (FIB) 416.

The message processing component 402 can receive a data request message 418 (also called interest message) from a requester (e.g., an IoT application or another router) requesting certain data. For supporting semantic mashup, the data request message 418 can include information of semantic mashup, for example, a name of requested data (also called the targeted data), one or more names of low-level data to be used for generating the requested data, and one or more SMLs describing how to generate the requested data from the one or more low-level data.

Table 1 shows an example of the data request message 418 that includes mashup operations of N levels. The data request message 418 can include a name of the targeted data (the Nth level data), a name of the (N−1)th level data, an SML describing how to generate the Nth level data using the (N−1)th level data, a name of the (N−2)th level data, an SML describing how to generate the (N−1)th level data using the (N−2)th level data, and so on until the 0th level data. The (N−1)th level data, (N−2)th level data, till the 0th level data are also called low-level data. In some cases, an SML can describe a relationship for more than two levels of data. For example, an SML can describe how to generate the Nth level data based on the (N−1)th level data and the (N−2) level data. Note that the existing data request message does not include SML(s) and data name(s) for (N−1)th level till 0th level.

TABLE 1

Data request message with in-network semantics mashup integration

| Targeted data name (Nth level data) | Semantic mashup logic for Nth level data | (N−1)th level data that is used for semantic mashup to generate Nth level data | Semantic mashup logic for (N−1)th level data | ... | 0th level data |
|---|---|---|---|---|---|

The 0th level data can be the raw data produced by physical IoT devices. In some cases, an SML can be omitted from the data request message 418 if the SML has been configured in the router. For example, as discussed above, an SML can be a tool that is configured in the router 400. The tool can be specified with input and output data names. If an SML is omitted from the data request message 418, the router 400 can determine if a configured SML can be used. For example, if the data request message 418 omits the SML of generating the Nth level data based on the (N−1)th level data, the router 400 can determine if the input and output data names of a configured SML match the Nth level and (N−1)th level data names, and use the matched SML for semantic mashup. In some cases, as mentioned above, the data request message 418 can also include a name of an ultimately targeted data (i.e., the data that an IoT application originally asks for). Details of processing the data request message 418 will be discussed in FIGS. 7A-7B.

The message processing component 402 can also receive a data response message 420. For example, the ICN router 400 can send a data request message to a physical IoT device or another router requesting certain data, and the physical IoT device or the other router can reply with a data response message including the requested data. Details of processing the data response message 420 will be discussed in FIG. 8.

When processing the data request message 418 and the data response message 420, the message processing component 402 can interact with the CS 412, the PIT 414, and the FIB 416. The CS 412 can be a database or memory for storing data. The FIB 416 can be a routing table. For example, each entry of the routing table includes a data name and the router's outgoing interface of the next-hop router or the data producer for retrieving that data. The PIT 414 records the pending data requests that the router 400 has sent out but not received replies yet. Each entry of the PIT can include a data name and the router's incoming interface(s) where the data request message(s) requesting that data came from. In some cases, the router 400 can receive multiple data request messages from different incoming interfaces requesting the same data, and the PIT entry can include a list of the different incoming interfaces.

For example, the router 304b in FIG. 3 is connected to four routers 304c and 304e-304g. Therefore, the router 304b has four interfaces corresponding to the four routers, e.g., interface 1, 2, 3, and 4 for the routers 304c and 304e-304g, respectively. The router 400 can receive a data request message from the router 304c (i.e., the interface 1) requesting particular data. Assume that the router 400 does not have the particular data, that the particular data name is not in the PIT 414 (i.e., the router 400 has not requested the particular data), and that the FIB 416 shows that the router 304g (i.e., interface 4) has the particular data. In that case, the router 400 can forward the data request message to the outgoing interface 4. At the same time, the router 400 can create an PIT entry that includes the particular data name and the incoming interface of the data request message (i.e., interface 1). The incoming interface is recorded so that after the router 400 receives the particular data from the router 304g, the router 400 can forward the particular data through the interface where the data request messages arrived.

SMC 404 can include an SML collection 406 and a computation engine 408. The SML collection 406 can be a database for storing SMLs. An SML can be a data analytics tool, e.g., a video analysis tool for analyzing traffic speed from traffic videos, that is provisioned to or configured at the router 400. An SML can also be a mathematical formula describing how to generate the targeted data from one or more low-level data. The message processing component 402 can extract the SML from the input data request message 418 and send the extracted SML to the SML collection 406. The computation engine 408 can use data from the CS 412 and SMLs from the SMC 406 or the data request message 418 to perform semantic mashup and generate new data. The new mashup data can be cached in the CS 412. In some cases, the naming function 410 can give a name to the new mashup data. The name of the new data can be maintained in the FIB 416 with possible aggregation (names with a same prefix can be maintained in one entry in the FIB). The router 400 can propagate the name of the new mashup data to other routers in the network so that other routers can update their FIB routing tables. The router 400 can be consider as a provider or producer of the new mashup data.

In some implementations, for constructing a data request message, a data requester can query a semantic server to determine data names to be included in the data request message. For example, in the network illustrated in FIG. 3, a best path calculation application (e.g. the best path calculation app 310) can request the best route from office to home. Before the best path calculation application is able to construct a data request message with in-network semantic mashup integration, the following steps can be taken to obtain data names (either original data collected by physical IoT devices or virtual data derived by virtual IoT devices). For example, the best path calculation application can first use a map service, such as GOOGLE map, and obtain three alternative paths from office to home. The best path calculation application then sends a semantic query to a semantic server and queries names of the traffic videos that are collected by surveillance cameras deployed on the routes of the three alternative paths. For example, the semantic server can be a centralized server that associates data names of traffic videos to corresponding routes. The semantic query can include route names, and the semantic server can return the data names of the corresponding traffic videos. For example, the semantic serve can return the following data names for traffic videos:

Path 1: TrafficVideo.RouteA, TrafficVideo.RouteG,
Path 2: TrafficVideo.RouteB, TrafficVideo.RouteE, TrafficVideo.RouteF, and
Path 3: TrafficVideo.RouteC, TrafficVideo.RouteD.

Figure 6:
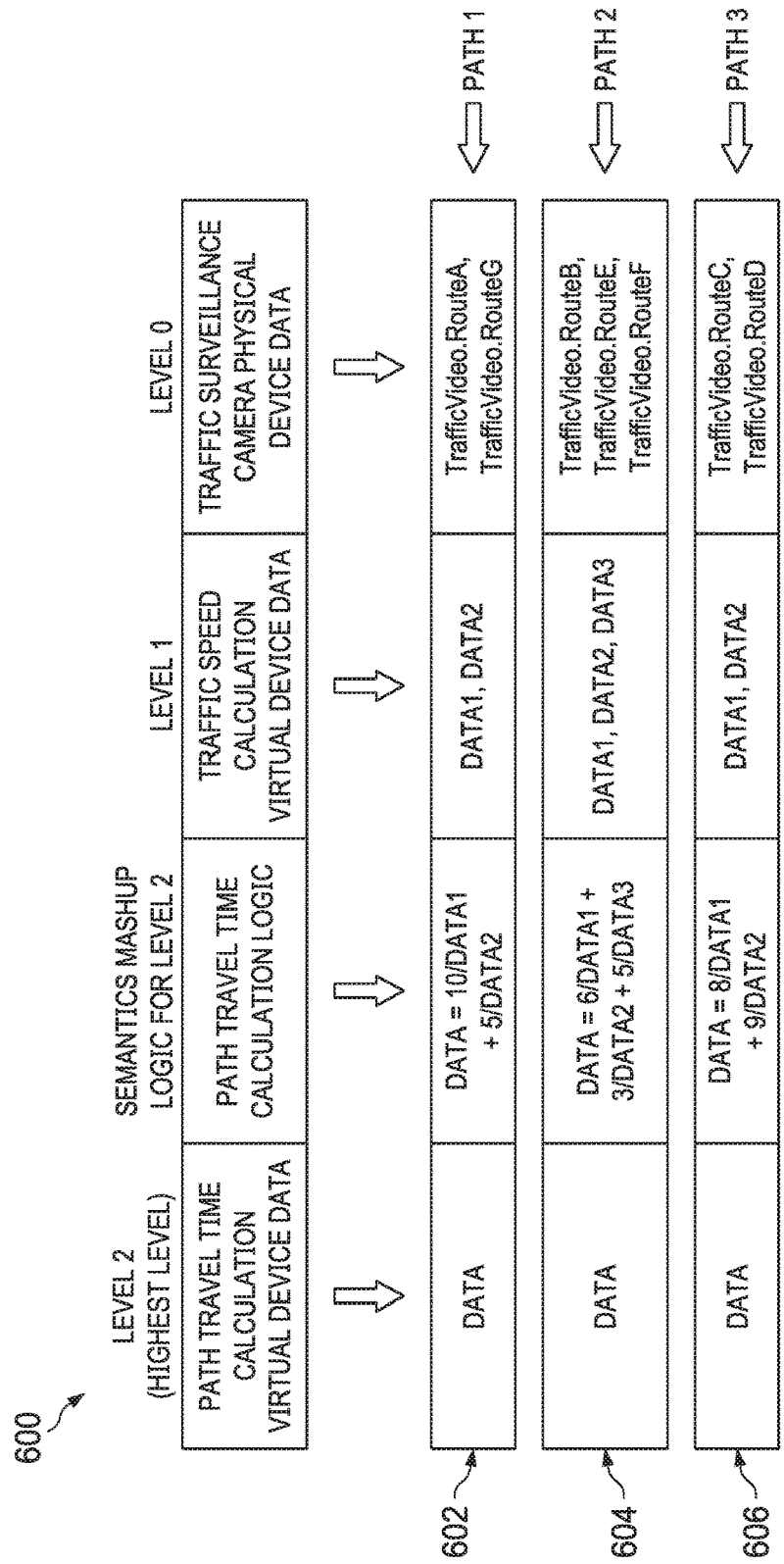
FIG. 6 illustrates a second set of example data request messages when data names are partially known, according to an implementation.

The best path calculation application can construct a data request message for each path to include information for in-network semantic mashup. As illustrated in FIG. 2, for calculating the path travel time (level 2 data), traffic speed (level 1 data) and traffic video (level 0 data) are used. In some cases, the best path calculation application may or may not know data names of all levels. FIGS. 5 and 6 show data request messages when data names are fully and partially known.

FIG. 5 illustrates a first set 500 of example data request messages when data names are fully known, according to an implementation. The first set 500 includes data request messages 502, 504, and 506 for the three alternative paths discussed above, where the best path calculation application knows data names of all three levels (e.g., provided by the semantic server). As a result, the data request message 502, 504, and 506 explicitly specify the data names of all three levels. Based on the distance of each route, the best path calculation application can determine the level 2 SML for deriving the path travel time based on the traffic speed. For example, if the route A has 10 miles and the route G has 5 miles, the SML 508 becomes TravelTime.Path1=10/TrafficSpeed.RouteA+5/TrafficSpeed.RouteG. Note that the level 1 SML is not specified in the data request messages 502, 504, and 506 because the logic of analyzing traffic video for traffic speed can be provisioned in the SML collection component in routers (e.g., SML collection 406).

FIG. 6 illustrates a second set 600 of example data request messages when data names are partially known, according to an implementation. The second set 600 includes data request messages 602, 604, and 606 for the three alternative paths. The best path calculation application is not aware of the data names for level 1 and level 2, hence denotations (e.g., data1, data2, and data3) are used in the data request messages 602, 604, and 606.

Figure 7A:
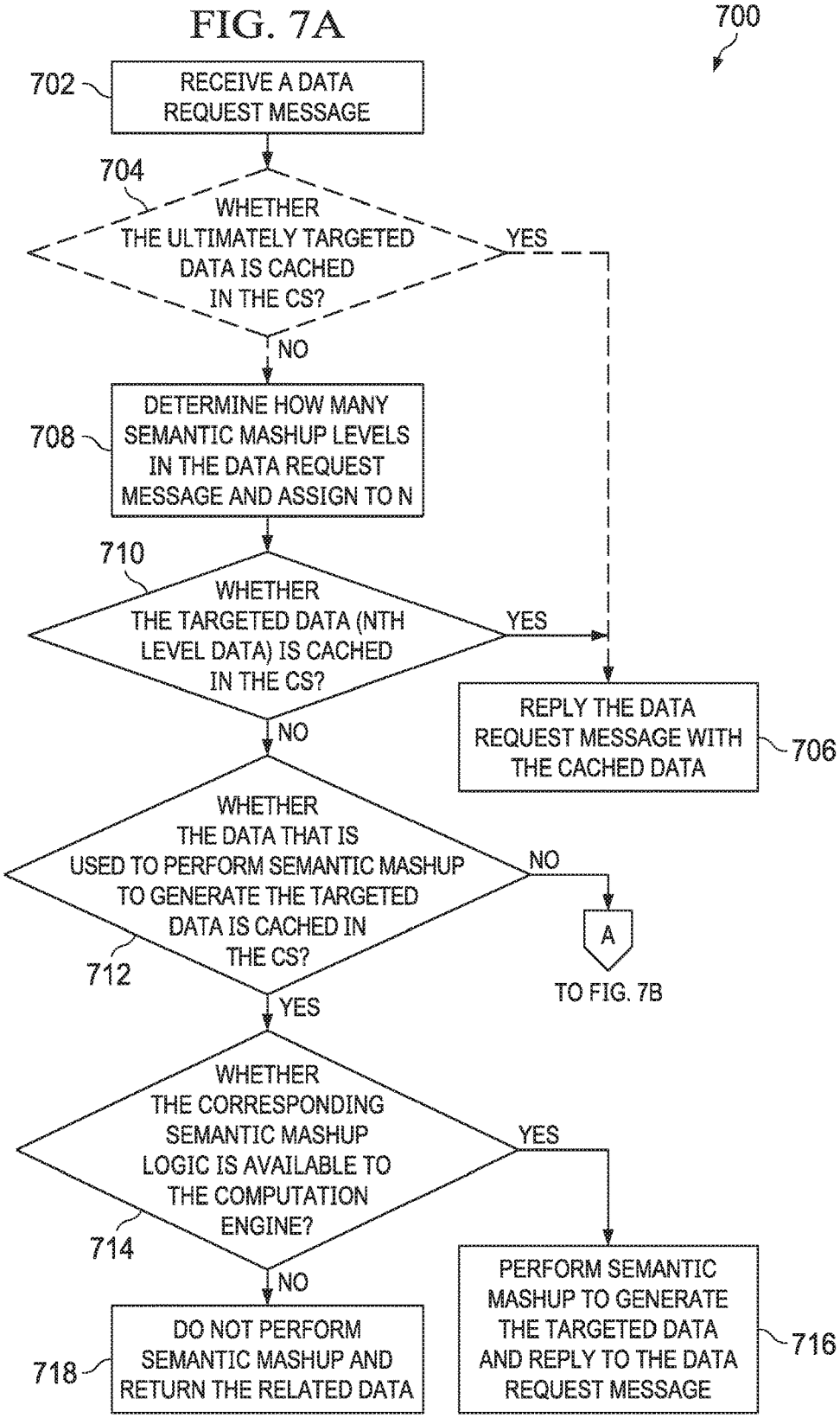
FIGS. 7A-7B illustrate a flowchart of an example method for processing a data request message at a router, according to an implementation.
Figure 7B:
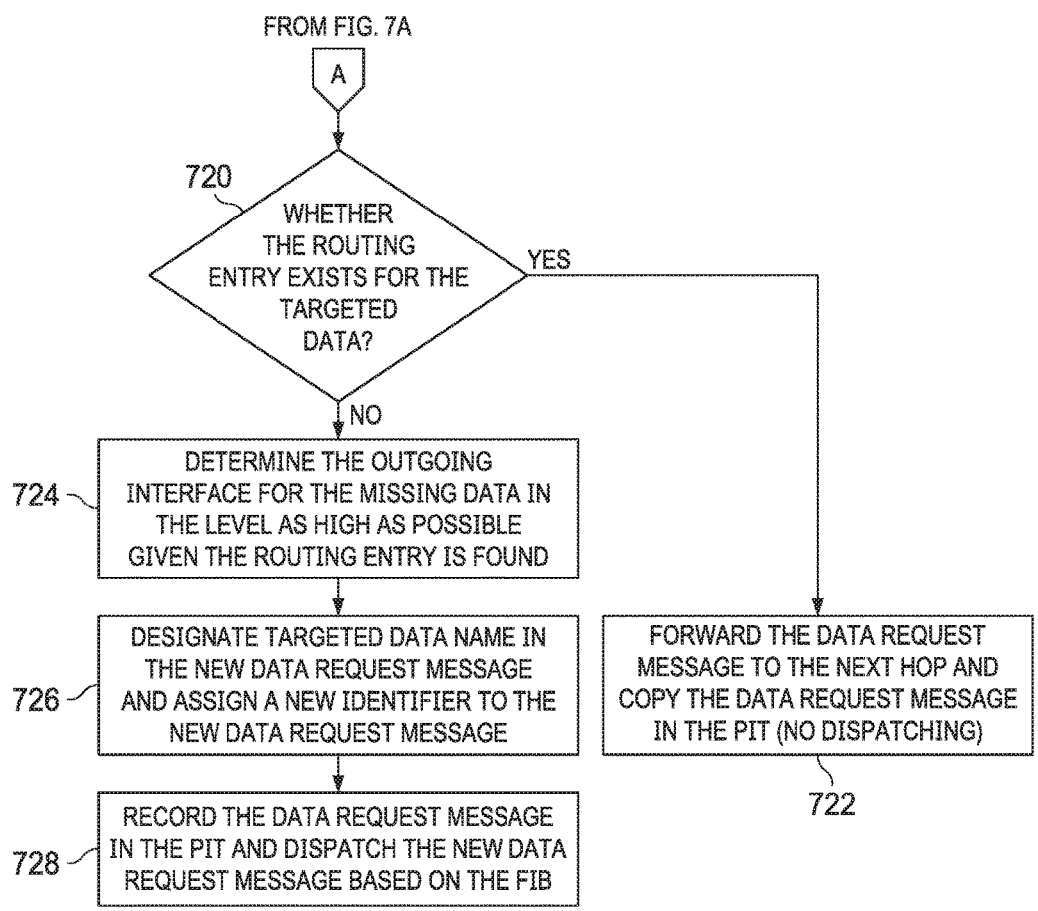

FIGS. 7A-7B illustrate a flowchart of an example method 700 for processing a data request message at a router, according to an implementation. The method 700 can be implemented by the ICN router 400 in FIG. 4. For clarity of presentation, the description that follows generally describes method 700 in the context of the other figures in this description. However, it will be understood that method 700 can be performed, for example, by any suitable system, environment, software, and hardware, or a combination of systems, environments, software, and hardware, as appropriate. In some implementations, various steps of method 700 can be run in parallel, in combination, in loops, or in any order.

At 702, the router receives a data request message from a requester (e.g., an IoT application or another router), such as the data request message described in Table 1 or the data request message 502 in FIG. 5. In some cases, the data request message can also include a name of an ultimately targeted data, as will be shown in Tables 2 and 3, which can be the data that a requesting IoT application originally asked for. The router can determine whether the ultimately targeted data name is included in the data request message. If the ultimately targeted data name is included in the data request message, method 700 proceeds to 704. Otherwise, method 700 proceeds to 708.

At 704, the router determines whether the ultimately targeted data is cached in the CS of the router (e.g., CS 412). If the ultimately targeted data is cached in the router, method 700 proceeds to 706. Otherwise, method 700 proceeds to 708.

At 706, the router sends a data response message back to the requester including the ultimately targeted data. After 706, method 700 stops.

At 708, the router determines a number of semantics mashup levels, denoted as N, in the data request message. For example, for the data request message 502, N equals 2, where the targeted data (level 2 data) is TravelTime.Path1, the level 1 data is TrafficSpeed.RouteA and TrafficSpeed.RouteG, and the level 0 data is TrafficVideo.RouteA and TrafficVideo.RouteG. From 708, method 700 proceeds to 710.

At 710, the router determines whether the targeted data (Nth level data) is cached in the CS. If the targeted data is cached in the router, method 700 proceeds to 706, where the router sends a data response message back to the requester including the targeted data. If the targeted data is not cached in the router, method 700 proceeds to 712.

At 712, the router determines whether the low level data used to generate the targeted data is cached in the CS. For example, for the data request message 502, the router can determine whether level 1 data (TrafficSpeed.RouteA and TrafficSpeed.RouteG) or level 0 data (TrafficVideo.RouteA and TrafficVideo.RouteG) is available. If the low level data (either level 1 data or level 0 data) is cached in the router, method 700 proceeds to 714. Otherwise method 700 proceeds to 720.

At 714, the router determines whether the SML(s) for generating the target data from the low level data is available to a computation engine (e.g., computation engine 408). The SML(s) can be either specified in the data request message or found in the SML collection 406. If the SML(s) is available, method 700 proceeds to 716. Otherwise, method 700 proceeds to 718.

At 716, the computation engine performs the semantic mashup to generate the targeted data. For example, for the data request message 502, if level 0 data is available while level 1 data is not, the router can generate level 1 data from level 0 data using the video analyzing tool stored or configured in the SML collection 406, and generate the target data from level 1 data using the SML specified in the data request message 502. After generating the targeted data, the router can send a data response message back to the requester including the generated targeted data. In some cases, the router can store the newly generated data (e.g., the targeted data, level 1 data, or both) in CS for future use. In some cases, the router can also notify other routers of the name(s) of the newly generated data so that the new data can be reused by other routers. After 716, method 700 stops.

At 718, the computation engine does not perform the semantic mashup because the SML(s) is not available. The router sends a data response message back to the requester including the low level data cached at the router. After 718, method 700 stops.

At 720, the router determines whether a routing entry exists in the FIB for the targeted data. For example, the router can determine if the targeted data name matches a data name in a routing entry. In some cases, for real-time data such as the travel time or traffic video data, the data name may include time information associated with the data. For example, the time stamp when the traffic video was collected can be part of the data name. In other words, the data name can include a data content name and a time stamp.

If the FIB has a single data name that has the same data content name as the targeted data name, then that single data name is considered to be the matched data name. If the FIB has multiple data names that has the same data content name as the targeted data name (that is, at least one of those multiple data names in the FIB has a time stamp), and if the targeted data name does not include a time stamp, then the data name in the FIB that has a most recent time stamp can be considered as the matched data name. If the FIB has multiple data names that has the same data content name as the targeted data name, and if the targeted data name includes a time stamp, then the data name in the FIB that has a time stamp closest to the time stamp in the targeted data name can be considered as the matched data name. In some implementations, the data request message in Table 1 can have an additional field including time information of the requested data.

In some cases, before the router determines whether a routing entry exists in the FIB for the targeted data, the router can first determine whether an PIT entry exists for the targeted data. If the targeted data name matches a data name in a PIT entry (i.e., the router has already requested the targeted data and is waiting for a reply), the router can update the PIT entry to include the incoming interface of the received data request message if that incoming interface is not in the incoming interface list of the PIT entry. If no PIT entry exists for the targeted data, the router then determines if an FIB routing entry exists for the targeted data. If a routing entry exists for the targeted data, method 700 proceeds to 722. Otherwise, method 700 proceeds to 724.

At 722, the router forwards the received data request message to the next hop based on the matched routing entry in the FIB. The router can also create a PIT entry for the forwarded data request message. For example, the new PIT entry can include the targeted data name of the data request message and the incoming interface of the data request message. In some cases, the new PIT entry can include the data request message. After 722, method 700 stops.

At 724, the router determines a highest level of missing data (not cached in the router) given a routing entry can be found. The router can also determine the outgoing interface(s) for the highest level of missing data. For example, for the data request message 502, assume that the targeted data TravelTime.Path1 is not stored in the CS and does not match any entry in the FIB and PIT, and that level 1 data TrafficSpeed.RouteA and TrafficSpeed.RouteG are not stored in the CS, do not have matched PIT entries, but have matched routing entries. In this case, level 1 data is considered to be the highest level of missing data having routing entries. For another example, assume that the targeted data and level 1 data are not stored in the CS and do not match any entry in the FIB and PIT, and that level 0 data TrafficVideo.RouteA and TrafficVideo.RouteG are not stored in the CS, do not have matched PIT entries, but have matched routing entries. In this case, level 0 data is considered to be the highest level of missing data having routing entries. From 724, method 700 proceeds to 726.

At 726, the router generates new data request message(s) requesting the missing data determined at 724. The new data request message is also called dispatched data request message, and the data request message received at 702 is also called original data request message. In other words, dispatched data request message can be generated for the router to retrieve the missing low-level data. The targeted data name in the dispatched data request message is set to be the name of the missing data. A message identifier can be assigned to the dispatched data request message and included in the dispatched data request message. Details of the dispatched data request message will be discussed in Tables 2 and 3. In some implementations, the number of dispatched data request messages is the same as the number of different outgoing interfaces for the missing data. For example, if the highest level of missing data TrafficVideo.RouteA and TrafficVideo.RouteG have different outgoing interfaces, then two dispatched data request messages are generated. In some cases, if the highest level of missing data all have the same outgoing interface, the router may simply forward the original data request message, without generating a new dispatched data request message. From 726, method 700 proceeds to 728.

At 728, the router creates a PIT entry for the original data request message. The PIT entry records the original data request message and includes information of the dispatched data request message(s). Details of the PIT entry including information of dispatched data request message(s) will be discussed in Table 4. The router can also create PIT entry(ies) for the dispatched data request message(s). The router can send out the dispatched data request message(s) based on the routing entry(ies) found at 724. After 728, method 700 stops.

In some cases, if the targeted data and all the low-level data are missing at the router, and if no FIB routing entry exists for the targeted data name, the router checks the FIB to see if FIB entry(ies) exist for the missing data in the (N−1)th level until it reaches the zeroth level. For example, after the router receives the data request message 502, the router first determines if routing entries exist for the missing level 1 data TrafficSpeed.RouteA and TrafficSpeed.RouteG. If routing entries exist and no PIT entries for the missing level 1 data, two dispatched data request messages are generated for requesting TrafficSpeed.RouteA and TrafficSpeed.RouteG (as shown in Table 3), respectively, and are dispatched to the outgoing interfaces based on the routing entries. If routing entries do not exist for the missing level 1 data, the router continues to determine if routing entries exist for the missing level 0 data. If routing entries exist and no PIT entries for the missing level 0 data, two dispatched data request messages can be generated for requesting TrafficVideo.RouteA and TrafficVideo.RouteG, respectively (as shown in Table 2).

Table 2 shows an example dispatched data request message that requests missing level 0 data TrafficVideo.RouteA. The router maintains a routing entry for TrafficVideo.RouteA, and the targeted data name in the dispatched data request message is set to be TrafficVideo.RouteA.

TABLE 2

A first example of dispatched data request message

| Targeted data name | Original data request message identifier | Ultimately targeted data name |
|---|---|---|
| TrafficeVideo.RouteA | 123456 | TravelTime.Path1 |

As shown in Table 2, the dispatched data request message can include the ultimately targeted data name TravelTime.Path1, which is the targeted data name of the original data request message (e.g., the data request message 502) received from the IoT application. The ultimately targeted data name is included for opportunistic data retrieval in case, e.g., the next-hop router happens to have the ultimately targeted data available. The router can also assign an identifier to the original data request message that triggers the dispatched data request messages. The dispatched data request message can include the identifier of the original data request message, e.g., 123456.

Table 3 shows an example dispatched data request message that requests missing level 1 data TrafficSpeed.RouteA. The router maintains a routing entry for TrafficSpeed.RouteA, and the targeted data name in the dispatched data request message is set to be TrafficSpeed.RouteA.

TABLE 3

A second example of dispatched data request message

| Targeted data name | Data for semantic mashup to generate the targeted data | Original data request message identifier | Ultimately targeted data name |
|---|---|---|---|
| TrafficSpeed.RouteA | TrafficeVideo.RouteA | 123456 | TravelTime.Path1 |

Similar to Table 2, the example dispatched data request message in Table 3 includes the ultimately targeted data name and the identifier of the original data request message. In addition, for possible in-network semantic mashup, the low-level data name (and SML) used for semantic mashup to generate the targeted data can also be included in the dispatched data request message. In that case, the next-hop router can generate the targeted data TrafficSpeed.RouteA using semantic mashup if the next-hop router has TrafficVideo.RouteA.

Table 4 shows a PIT entry that includes information of dispatched data request messages. The PIT entry can include the original data request message, the identifier of the original data request message, and identifiers of the dispatched data request messages. Note that the existing PIT entry does not include identifiers of the dispatched data request messages.

TABLE 4

An example of PIT entry including information of dispatched data request messages

| Original data request message and identifier | List of dispatched data request message identifiers | Incoming interface |
|---|---|---|
| 123456 | 12789, 12790 | 2 |

In some cases, instead of including the original data request message, the PIT entry can include the targeted data name of the original data request message. If the original data request message is dispatched to multiple outgoing interfaces, the router can assign each dispatched message a new identifier. The identifiers of the dispatched data request messages (e.g. 12789, 12790) can be stored in the PIT entry. By storing the message identifiers, as will be discussed in FIG. 9, the router is able to associate the original data request message with the dispatched data request messages and the corresponding data response messages. In addition, the PIT entry can also include the incoming interface of the original data request message so that after the router receives the targeted data of the original data request message, the router can forward the data to the incoming interface where the original data request message arrived. In some cases, the PIT entry can include a list of incoming interfaces for data request messages requesting the same targeted data. If the original data request message did not trigger any dispatched data request message, then the PIT entry does not include any dispatched data request message identifier.

Table 5 illustrates example pseudo codes of an algorithm for processing a data request message at a router. The example pseudo codes can be implemented by the ICN router 400 in FIG. 4.

TABLE 5 pseudo codes for processing a data request message at a router

Algorithm: Procedure of processing a data request message with semantic mashup options
input: data request message, SML collection, data in the CS
output: forward or reply the data request message, or send dispatched data request messages
Case 1: If the ultimately targeted data is cached in the CS, then return the ultimately targeted data through the incoming interface of the data request message.
Case 2: If the ultimately targeted data is not cached in the CS AND the targeted data in the data request message is cached in the CS, then return the targeted data through the incoming interface of the data request message.
Case 3: If the ultimately targeted data is not cached in the CS AND the targeted data in the data request message is not cached in the CS AND all the data used to perform the semantic mashup is stored in the CS AND the corresponding logic is available to the computation engine, then perform the semantic mashup to generate the targeted data and return the generated targeted data through the incoming interface of the data request message.
Case 4: If the ultimately targeted data is not cached in the CS AND the targeted data is not cached in the CS AND a routing entry exists for the targeted data, then forward the data request message to the next hop without dispatching and record the data request message in the PIT.
Case 5: If the ultimately targeted data is not cached in the CS AND the targeted data is not cached in the CS AND a routing entry does not exist for the targeted data, then: determine the outgoing interface for the missing data in a level as high as possible given a routing entry can be found; designate the targeted data name in the new dispatched data request message and assign a new identifier to the dispatched data request; attach an identifier of the data request message in the dispatched data request message; and record the data request message in the PIT and forward the dispatched data request message based on the FIB.

The router can receive a data response message after sending out the data request message. Table 6 illustrates an example data response message.

TABLE 6

Format of a data response message

| Original data request message identifier | Dispatched data request message identifier | Data |
|---|---|---|

The data response message includes the returned data. In some cases, the data response message can also include the name of the returned data. If the data response message is in response to a dispatched data request message, the data response message can include the identifier of the original data request message and the identifier of the dispatched data request message. By including the message identifiers, as will be discussed in FIG. 9, the router is able to associate the received data response message with the original data request message and the corresponding dispatched data request message. If the data response message is in response to an original data request message (no dispatched data request message), then the data response message does not include any dispatched data request message identifier. Note that the existing data response message does not include any dispatched data request message identifier.

Figure 8:
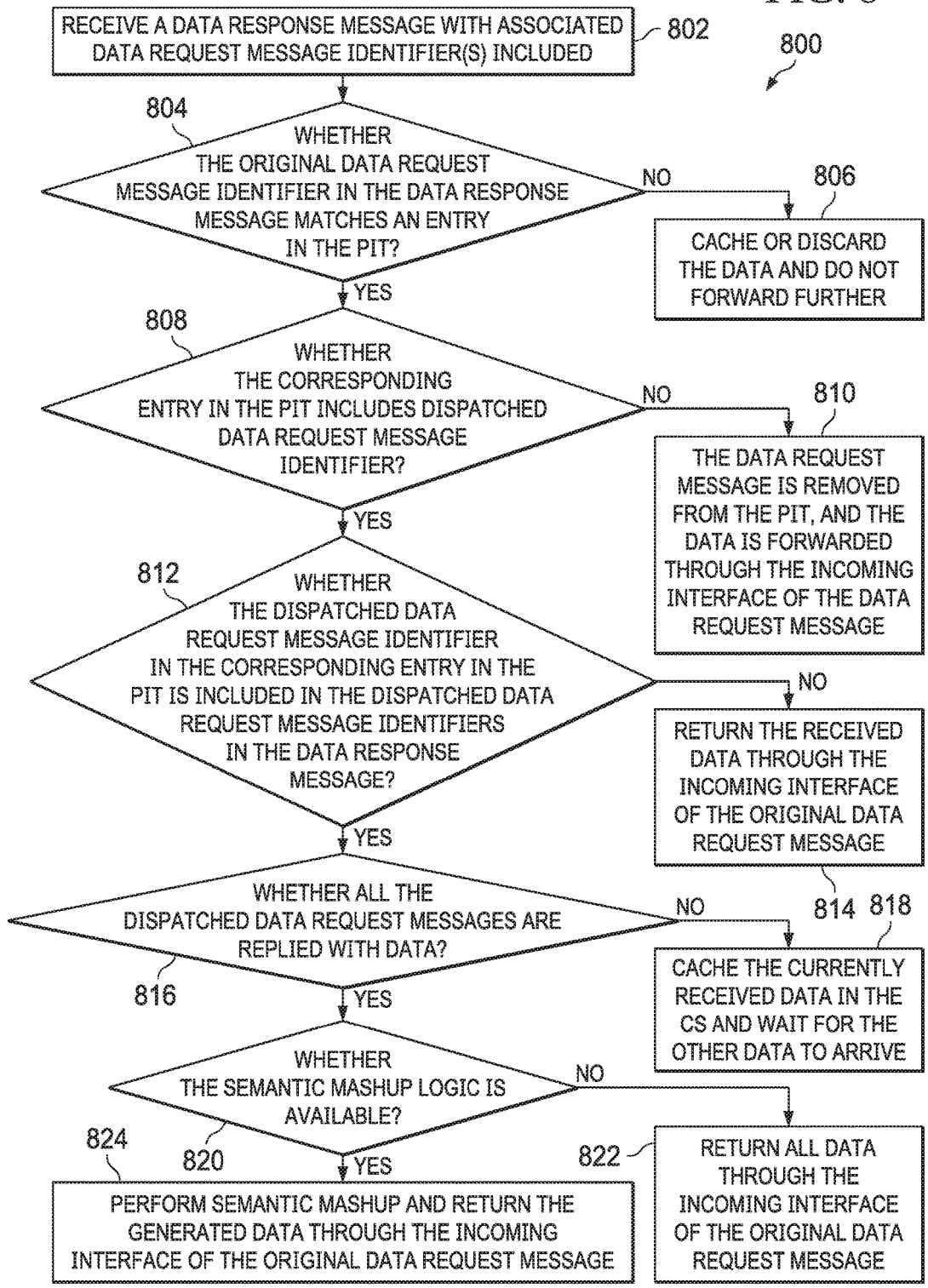
FIG. 8 illustrates a flowchart of an example method for processing of a data response message at a router, according to an implementation.

FIG. 8 illustrates a flowchart of an example method 800 for processing of a data response message at a router, according to an implementation. The method 800 can be implemented by the ICN router 400 in FIG. 4. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order.

At 802, the router receives a data response message including associated data request message identifier(s), for example, as shown in Table 6. From 802, method 800 proceeds to 804.

At 804, the router determines whether the original data request message identifier in the data response message matches the original data request message identifier in a PIT entry (e.g., a PIT entry shown in Table 4). If the original data request message identifier in the data response message matches a PIT entry, implying that the router either forwarded the original data request message or originated a dispatched data request message, method 800 proceeds to 808. Otherwise, method 800 proceeds to 806.

At 806, the router either caches or discards the data in the data response message. After 806, method 800 stops.

At 808, the router determines whether the matched PIT entry includes a list of dispatched data request message identifiers. If the matched PIT entry includes a list of dispatched data request message identifiers, method 800 proceeds to 812. If the matched PIT entry does not include a list of dispatched data request message identifiers, implying that the router forwarded the original data request message without dispatching, method 800 proceeds to 810.

At 810, the router forwards the data received in the data response message through the incoming interface(s) recorded in the matched PIT entry (i.e., the PIT entry of the original data request message). The router then removes the matched PIT entry. After 810, method 800 stops.

At 812, the router determines whether the dispatched data request message identifier in the data response message is included in the list of dispatched data request message identifiers in the matched PIT entry. If the dispatched data request message identifier in the data response message is included in the matched PIT entry, implying that the router originated the dispatched data request message, method 800 proceeds to 816. Otherwise, method 800 proceeds to 814.

At 814, the router forwards the data received in the data response message through the incoming interface(s) recorded in the matched PIT entry. After 814, method 800 stops.

At 816, the router determines whether all the dispatched data request messages have received replies. For example, the router can determine whether a data response message has received for each dispatched data request message listed in the matched PIT entry. If all the dispatched data request messages have received replies, method 800 proceeds to 820. Otherwise, method 800 proceeds to 818.

At 818, if some of the dispatched data request messages have not received replies, the router caches the currently received data in the CS and waits for other data to arrive. In some implementations, from 818, method 800 can go back to 816, waiting for all the dispatched data request messages to receive replies.

At 820, the router determines whether the SML for semantic mashup is available. The SML can be found in the original data request message or in the SML Collection. If the SML is available, method 800 proceeds to 824. Otherwise, method 800 proceeds to 822.

At 822, if the SML is absent, the router forwards the returned data of all dispatched data request messages through the incoming interface(s) recorded in the matched PIT entry. After 822, method 800 stops.

At 824, the router uses the SML to perform semantic mashup and return the generated data through the incoming interface(s) recorded in the matched PIT entry. The router then removes the matched PIT entry. After 824, method 800 stops.

Figure 9:
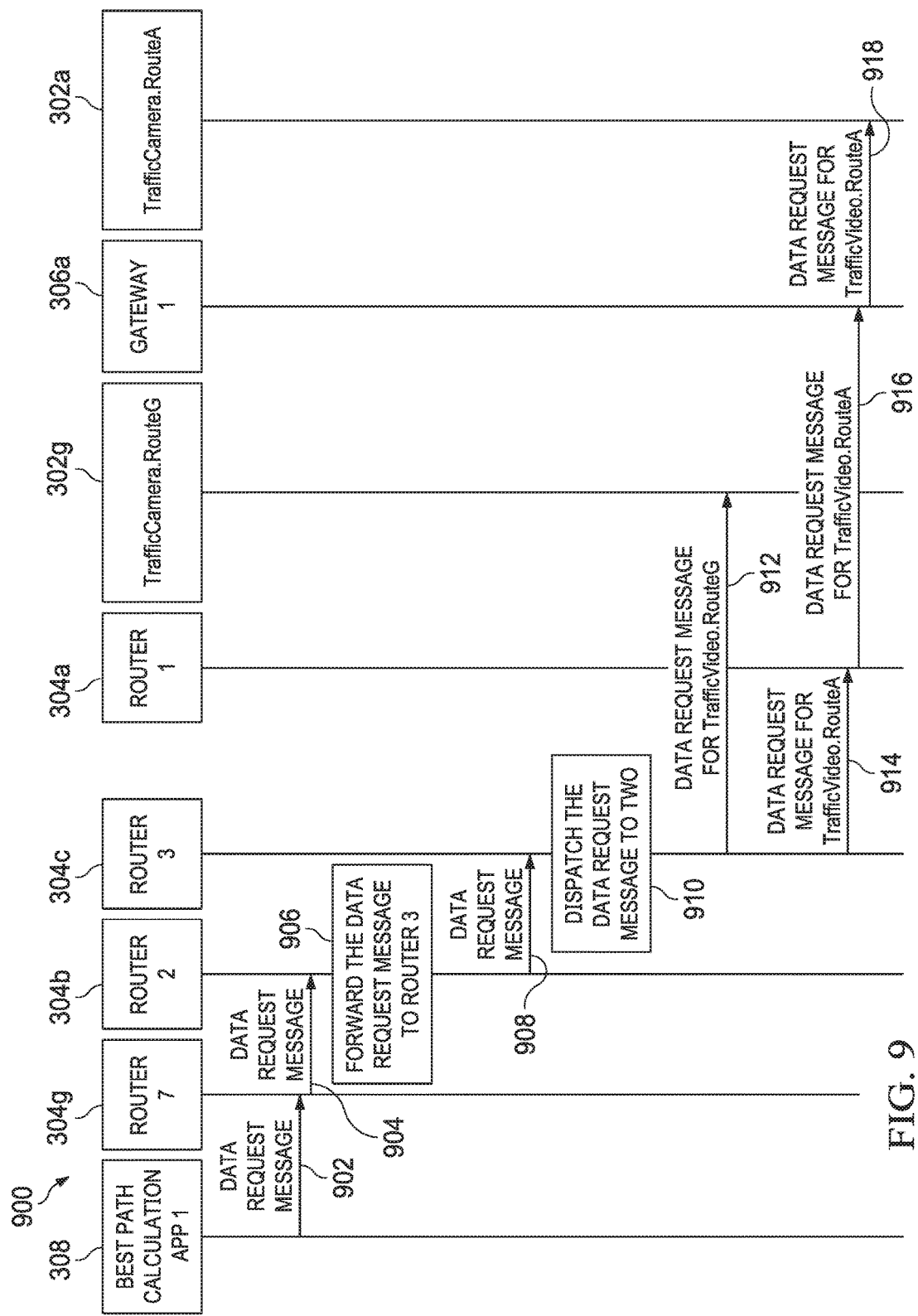
FIG. 9 is a flow diagram illustrating an example process for forwarding data request messages, according to an implementation.

FIG. 9 is a flow diagram illustrating an example process 900 for forwarding data request messages, according to an implementation. For clarity of presentation, the description that follows generally describes process 900 in the context of the other figures in this description. However, it will be understood that process 900 may be performed, for example, by any suitable system, environment, software, and hardware, or a combination of systems, environments, software, and hardware, as appropriate. In some implementations, various steps of process 900 can be run in parallel, in combination, in loops, or in any order.

The process 900 can be implemented by the network topology 300 in FIG. 3 and assumes that no prior semantic mashup has been performed in the network. The process 900 is performed by the best path calculation app 308, the routers 304a-304c and 304g, the gateway 306a, and the physical IoT devices TrafficCamera.RouteA 302a and TrafficCamera.RouteG 302g.

At 902, the best path calculation app 308 sends a data request message, e.g., the data request message 502, to the router 304g through the wireless base station 312a.

At 904, the router 304g determines that no FIB routing entry exists for TrafficSpeed.RouteA or TrafficSpeed.RouteG, but routing entries exist for TrafficVideo.RouteA and TrafficVideo.RouteG. Based on the routing entries, the router 304b also determine that TrafficVideo.RouteA and TrafficVideo.RouteG have a common outgoing interface that corresponds to the router 304b (i.e., the router 304b is a common forwarding router for both TrafficVideo.RouteA and TrafficVideo.RouteG). Therefore, the router 304g forwards the data request message 502 to the next-hop router 304b.

At 906, based on routing entries at the router 304b, the router 304b determines that TrafficVideo.RouteA and TrafficVideo.RouteG have a common outgoing interface that corresponds to the router 304c (i.e., the router 304c is another common forwarding router for both TrafficVideo.RouteA and TrafficVideo.RouteG).

At 908, the router 304b forwards the data request message 502 to the next-hop router 304c.

At 910, based on routing entries at the router 304c, the router 304c determines that the outgoing interfaces for TrafficVideo.RouteA and TrafficVideo.RouteG are different. Therefore, the router 304c generates two dispatched data request messages for the different outgoing interfaces of TrafficVideo.RouteA and TrafficVideo.RouteG, i.e. a first dispatched data request message going to the physical IoT device TrafficCamera.RouteG 302g which can provide the data TrafficVideo.RouteG, while a second dispatched data request message going to the router 304a which can reach the data TrafficVideo.RouteA.

At 912, the router 304c sends the first dispatched data request message for TrafficVideo.RouteG to the IoT physical device TrafficCamera.RouteG 302g.

At 914, the router 304c sends the second dispatched data request message for TrafficVideo.RouteA to the router 304a.

At 916, based on routing entries at the router 304*a*, the router 304*a* sends the second dispatched data request message for TrafficVideo.RouteA to the gateway 306*a*.

At 918, the gateway 306*a* sends the second dispatched data request message for TrafficVideo.RouteA to the physical IoT device TrafficCamera.RouteA 302*a*.

Figure 10:
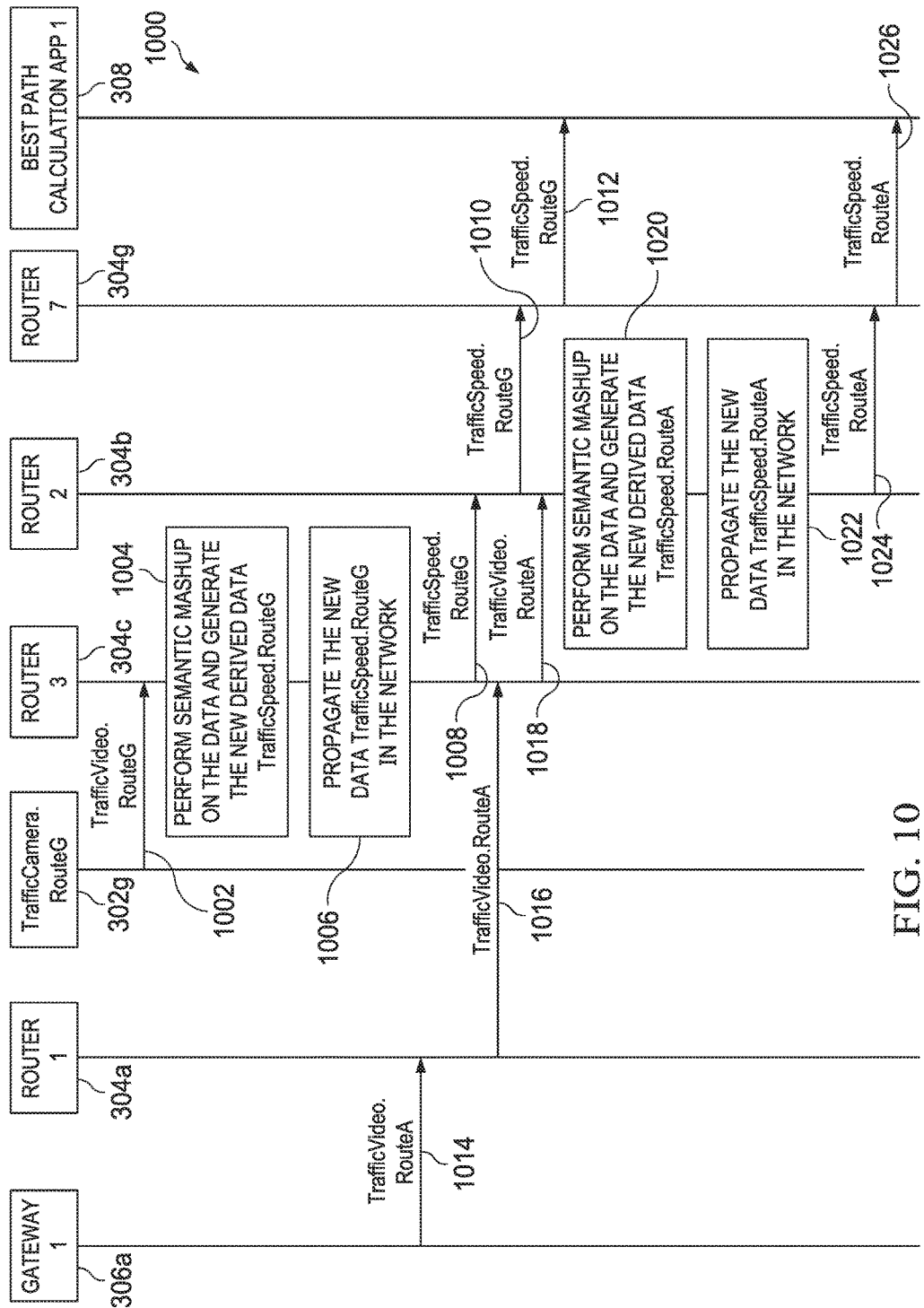
FIG. 10 is a flow diagram illustrating a first example process for in-network caching and semantic mashup, according to an implementation.

FIG. 10 is a flow diagram illustrating a first example process 1000 for in-network caching and semantic mashup, according to an implementation. For clarity of presentation, the description that follows generally describes process 1000 in the context of the other figures in this description. However, it will be understood that process 1000 may be performed, for example, by any suitable system, environment, software, and hardware, or a combination of systems, environments, software, and hardware, as appropriate. In some implementations, various steps of process 1000 can be run in parallel, in combination, in loops, or in any order.

The process 1000 is a continuation of the process 900 in FIG. 9. The process 1000 can be implemented by the network topology 300 in FIG. 3 and performed by the best path calculation app 308, the routers 304*a*-304*c* and 304*g*, the gateway 306*a*, the physical IoT devices TrafficCamera.RouteA 302*a* and TrafficCamera.RouteG 302*g*. The physical IoT devices TrafficCamera.RouteA 302*a* and TrafficCamera.RouteG 302*g* are assumed not to have capacities for analyzing traffic videos to return data TrafficSpeed.RouteA and TrafficSpeed.RouteG. As a result, after 912 the device TrafficCamera.RouteG 302*g* replies with the data TrafficVideo.RouteG, and after 918 the device TrafficCamera.RouteA 302*a* replies with the data TrafficVideo.RouteA.

At 1002 (following 912), the device TrafficCamera.RouteG 302*g* sends the data TrafficVideo.RouteG to the router 304*c*.

At 1004, the router 304*c* chooses to cache the data TrafficVideo.RouteG. For example, a set of criteria can be provided regarding conditions to cache data. For instance, the set of criteria can include a threshold data size. If the data to be cached is larger than the threshold, the router 304*c* does not cache the data. The set of criteria can also include a threshold available memory size. If the available memory size at the router 304*c* is smaller than the threshold, the router 304*c* does not cache the data. Assume that the router 304*c* has the capability of analyzing the traffic video and calculating the traffic speed after caching the traffic video. As a result, the router 304*c* performs semantic mashup and derives TrafficSpeed.RouteG based on TrafficVideo.RouteG. The derived data TrafficSpeed.RouteG is stored at the router 304*c*.

At 1006, the router 304*c* notifies neighboring routers of the derived mashup data TrafficSpeed.RouteG so that the routers 304*a* and 304*b* can have a routing entry set up for the mashup data TrafficSpeed.RouteG.

At 1008, the router 304*c* forwards the data TrafficSpeed.RouteG to the router 304*b*, e.g., based on the incoming interface recorded in the PIT entry.

At 1010, the router 304*b* forwards the data TrafficSpeed.RouteG to the router 304*g*.

At 1012, the router 304*g* forwards the data TrafficSpeed.RouteG to the best path calculation app 308.

At 1014 (following 918), after receiving the data TrafficVideo.RouteA from the device TrafficCamera.RouteA 302*a*, the gateway 306*a* forwards the data TrafficVideo.RouteA to the router 304*a*.

At 1016, the router 304*a* forwards the data TrafficVideo.RouteA to the router 304*c*. For example, the router 304*a* forwards the data TrafficVideo.RouteA if the router 304*a* does not the capability to cache the data TrafficVideo.RouteA. In some cases, the router 304*a* forwards the data TrafficVideo.RouteA if the router 304*a* does not have the traffic analysis tool to perform the semantic mashup for generating the TrafficSpeed.RouteA data from the TrafficVideo.RouteA data.

At 1018, the router 304*c* forwards the data TrafficVideo.RouteA to the router 304*b*.

At 1020, the router 304*b* chooses to cache the data TrafficVideo.RouteA based on a set of caching criteria. The router 304*b* has the capability of analyzing the traffic video and calculating the traffic speed after caching the traffic video. As a result, the router 304*b* performs semantic mashup to derive TrafficSpeed.RouteA based on TrafficVideo.RouteA. The derived data TrafficSpeed.RouteA is stored at the router 304*b*.

At 1022, the router 304*b* notifies neighboring routers of the derived mashup data TrafficSpeed.RouteA so that routers 304*c*, 304*e*, 304*f*, and 304*g* can have a routing entry set up for the mashup data TrafficSpeed.RouteA.

At 1024, the router 304*b* forwards the data TrafficSpeed.RouteA to the router 304*g*.

At 1026, the router 304*g* forwards the data TrafficSpeed.RouteA to the best path calculation app 308. After receiving both TrafficSpeed.RouteA and TrafficSpeed.RouteG, the best path calculation app 308 can calculate the average travel time.

Figure 11:
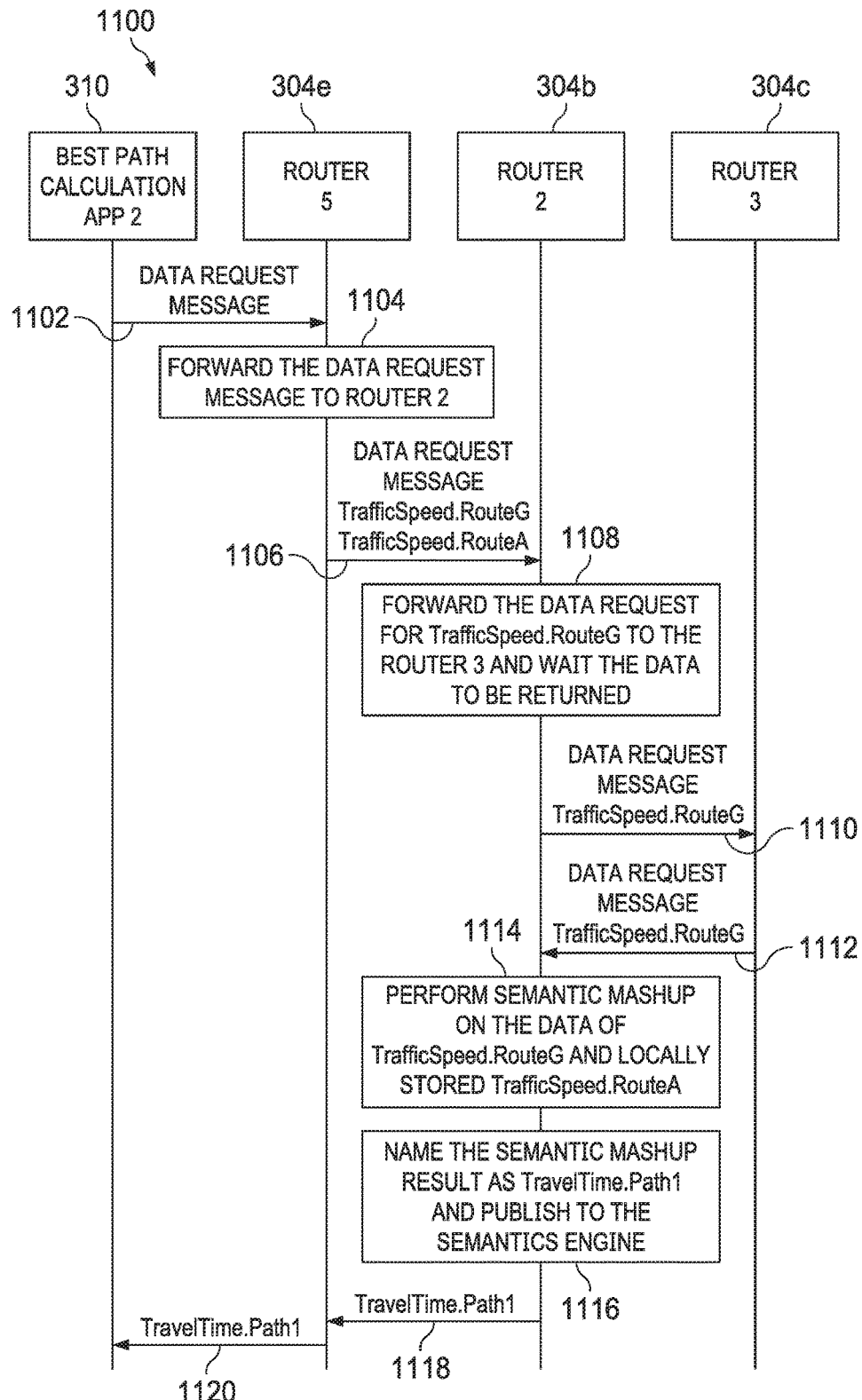
FIG. 11 is a flow diagram illustrating a second example process for in-network caching and semantic mashup, according to an implementation.

FIG. 11 is a flow diagram illustrating a second example process 1100 for in-network caching and semantic mashup, according to an implementation. For clarity of presentation, the description that follows generally describes process 1100 in the context of the other figures in this description. However, it will be understood that process 1100 may be performed, for example, by any suitable system, environment, software, and hardware, or a combination of systems, environments, software, and hardware, as appropriate. In some implementations, various steps of process 1100 can be run in parallel, in combination, in loops, or in any order.

The process 1100 can be implemented by the network topology 300 in FIG. 3 and performed by the second best path calculation app 310, and the routers 304*b*, 304*c*, and 304*e*. The process 1100 assumes that prior semantic mashup has been performed in the network.

At 1102, the best path calculation app 310 sends a data request message, e.g., the data request message 502, to the router 304*e*.

At 1104, the router 304*e* determines that routing entries are maintained for TrafficSpeed.RouteA and TrafficSpeed.RouteG, and that both TrafficSpeed.RouteA and TrafficSpeed.RouteG have a common outgoing interface towards the router 304*b*. Based on the routing entries, the router 304*e* determines to forward the data request message 502 to the next-hop router 304*b*.

At 1106, the router 304*e* forwards the data request message 502 to the router 304*b*.

At 1108, the router 304*b* determines that a routing entry is maintained for the data TrafficSpeed.RouteG. Because the router 304*b* has previously cached the data TrafficSpeed.RouteA, instead of returning the data TrafficSpeed.RouteA to the best path calculation app 310 immediately, the router 304*b* waits for the data TrafficSpeed.RouteG to be replied.

At 1110, the router 304*b* sends a data request message to the router 304*c* requesting TrafficSpeed.RouteG.

At 1112, the router 304*c* returns the data TrafficSpeed.RouteG to the router 304*b*.

At 1114, the router 304*b* performs semantic mashup and derives travel time data based on the locally stored data TrafficSpeed.RouteA and the received data Traffic Speed.RouteG based on the SML provided in the data request message 502.

At 1116, the router 304*b* can register the path travel time virtual device and the derived data (i.e., TravelTime.Path1) to a centralized semantic engine. In some cases, the router 304*b* can use the naming function 410 to name the semantics mashup result as TravelTime.Path1.

At 1118, the router 304*b* returns the derived path travel time TravelTime.Path1 to the router 304*e*.

At 1120, the router 304*e* returns TravelTime.Path1 to the best path calculation app 310.

In some cases, if a third best path calculation app (different than the best path calculation apps 308 and 310) is able to discover the name of the derived data Travel Time.Path1 from the semantic engine, the third best path calculation app can request the derived data directly without including other data names or SML in the request message (i.e. only TravelTime.Path1 is included in the data request message).

Figure 12:
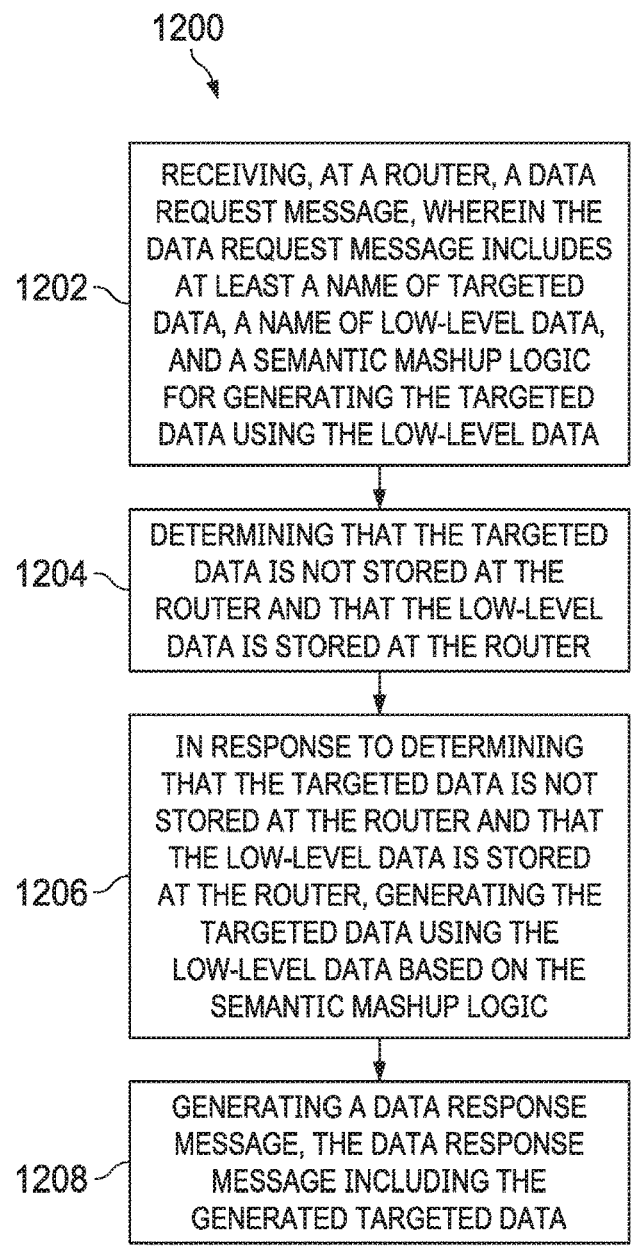
FIG. 12 is a flowchart illustrating an example method for semantic mashup operations, according to an implementation.

FIG. 12 is a flowchart illustrating an example method 1200 for semantic mashup operations, according to an implementation. The method 1200 can be implemented by the router 400 in FIG. 4. The method 1200 can also be implemented using additional, fewer, or different components. Furthermore, the method 1200 can also be implemented using additional, fewer, or different operations, which can be performed in the order shown or in a different order. In some instances, an operation or a group of operations can be iterated or repeated, for example, for a specified number of iterations or until a terminating condition is reached.

The example method 1200 begins at 1202, where a router receives a data request message. The data request message includes at least a name of targeted data, a name of low-level data, and an SML for generating the targeted data using the low-level data. At 1204, the router determines that the targeted data is not stored at the router and that the low-level data is stored at the router. At 1206, in response to determining that the targeted data is not stored at the router and that the low-level data is stored at the router, the router generates the targeted data using the low-level data based on the semantic mashup logic. At 1208, the router generates a data response message. The data response message includes the generated targeted data.

Figure 13:
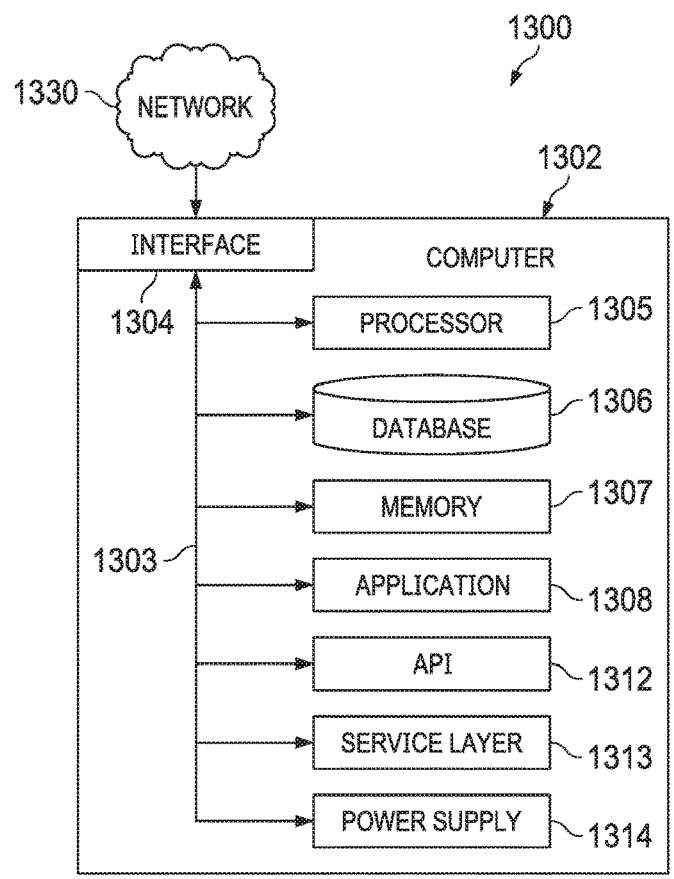
FIG. 13 is a block diagram illustrating an example computer system used to provide computational functionalities associated with described algorithms, methods, functions, processes, flows, and procedures as described in the instant disclosure, according to an implementation of the present disclosure.

FIG. 13 is a block diagram of an example computer system 1300 used to provide computational functionalities associated with described algorithms, methods, functions, processes, flows, and procedures, as described in the instant disclosure, according to an implementation. The computer system 1300, or more than one computer system 1300, can be used to implement the routers, the IoT devices, or devices hosting the IoT applications described previously in this disclosure. The illustrated computer 1302 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1302 may comprise a computer that includes an input device, such as a keypad, keyboard, touch screen, or other device that can accept user information, and an output device that conveys information associated with the operation of the computer 1302, including digital data, visual, or audio information (or a combination of information), or a graphical-type user interface (UI) (or GUI).

The computer 1302 can serve in a role as a client, network component, a server, a database or other persistency, or any other component (or a combination of roles) of a computer system for performing the subject matter described in the instant disclosure. The illustrated computer 1302 is communicably coupled with a network 1330. In some implementations, one or more components of the computer 1302 may be configured to operate within environments, including cloud-computing-based, local, global, or other environment (or a combination of environments).

At a high level, the computer 1302 is an electronic computing device operable to receive, transmit, process, store, or manage data and information associated with the described subject matter. According to some implementations, the computer 1302 may also include or be communicably coupled with an application server, e-mail server, web server, caching server, streaming data server, or other server (or a combination of servers).

The computer 1302 can receive requests over network 1330 from a client application (for example, executing on another computer 1302) and respond to the received requests by processing the received requests using an appropriate software application(s). In addition, requests may also be sent to the computer 1302 from internal users (for example, from a command console or by other appropriate access method), external or third-parties, other automated applications, as well as any other appropriate entities, individuals, systems, or computers.

Each of the components of the computer 1302 can communicate using a system bus 1303. In some implementations, any or all of the components of the computer 1302, hardware or software (or a combination of both hardware and software), may interface with each other or the interface 1304 (or a combination of both), over the system bus 1303 using an application programming interface (API) 1312 or a service layer 1313 (or a combination of the API 1312 and service layer 1313). The API 1312 may include specifications for routines, data structures, and object classes. The API 1312 may be either computer-language independent or dependent and refer to a complete interface, a single function, or even a set of APIs. The service layer 1313 provides software services to the computer 1302 or other components (whether or not illustrated) that are communicably coupled to the computer 1302. The functionality of the computer 1302 may be accessible for all service consumers using this service layer. Software services, such as those provided by the service layer 1313, provide reusable, defined functionalities through a defined interface. For example, the interface may be software written in JAVA, C++, or other suitable language providing data in extensible markup language (XML) format or other suitable format. While illustrated as an integrated component of the computer 1302, alternative implementations may illustrate the API 1312 or the service layer 1313 as stand-alone components in relation to other components of the computer 1302 or other components (whether or not illustrated) that are communicably coupled to the computer 1302. Moreover, any or all parts of the API 1312 or the service layer 1313 may be implemented as child or sub-modules of another software module, enterprise application, or hardware module without departing from the scope of this disclosure.

The computer 1302 includes an interface 1304. Although illustrated as a single interface 1304 in FIG. 13, two or more interfaces 1304 may be used according to particular needs, desires, or particular implementations of the computer 1302. The interface 1304 is used by the computer 1302 for communicating with other systems that are connected to the network 1330 (whether illustrated or not) in a distributed environment. Generally, the interface 1304 comprises logic encoded in software or hardware (or a combination of software and hardware) and is operable to communicate with the network 1330. More specifically, the interface 1304 may comprise software supporting one or more communication protocols associated with communications such that the network 1330 or interface's hardware is operable to communicate physical signals within and outside of the illustrated computer 1302.

The computer 1302 includes a processor 1305. Although illustrated as a single processor 1305 in FIG. 13, two or more processors may be used according to particular needs, desires, or particular implementations of the computer 1302. Generally, the processor 1305 executes instructions and manipulates data to perform the operations of the computer 1302 and any algorithms, methods, functions, processes, flows, and procedures as described in the instant disclosure.

The computer 1302 also includes a database 1306 that can hold data for the computer 1302 or other components (or a combination of both) that can be connected to the network 1330 (whether illustrated or not). For example, database 1306 can be an in-memory, conventional, or other type of database storing data consistent with this disclosure. In some implementations, database 1306 can be a combination of two or more different database types (for example, a hybrid in-memory and conventional database) according to particular needs, desires, or particular implementations of the computer 1302 and the described functionality. Although illustrated as a single database 1306 in FIG. 13, two or more databases (of the same or combination of types) can be used according to particular needs, desires, or particular implementations of the computer 1302 and the described functionality. While database 1306 is illustrated as an integral component of the computer 1302, in alternative implementations, database 1306 can be external to the computer 1302. The database 1306 can store previously described CS 412, PIT 414, FIB 416, or SML collection 406.

The computer 1302 also includes a memory 1307 that can hold data for the computer 1302 or other components (or a combination of both) that can be connected to the network 1330 (whether illustrated or not). Memory 1307 can store any data consistent with this disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same or combination of types) can be used according to particular needs, desires, or particular implementations of the computer 1302 and the described functionality. While memory 1307 is illustrated as an integral component of the computer 1302, in alternative implementations, memory 1307 can be external to the computer 1302.

The application 1308 is an algorithmic software engine providing functionality according to particular needs, desires, or particular implementations of the computer 1302, particularly with respect to functionality described in this disclosure. For example, application 1308 can serve as one or more components, modules, or applications. Further, although illustrated as a single application 1308, the application 1308 may be implemented as multiple applications 1308 on the computer 1302. In addition, although illustrated as integral to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion or management circuits (including recharging, standby, or other power management functionality). In some implementations, the power-supply 1314 can include a power plug to allow the computer 1302 to be plugged into a wall socket or other power source to, for example, power the computer 1302 or recharge a rechargeable battery.

There may be any number of computers 1302 associated with, or external to, a computer system containing computer 1302, each computer 1302 communicating over network 1330. Further, the term "client," "user," and other appropriate terminology may be used interchangeably, as appropriate, without departing from the scope of this disclosure. Moreover, this disclosure contemplates that many users may use one computer 1302, or that one user may use multiple computers 1302.

Figure 14:
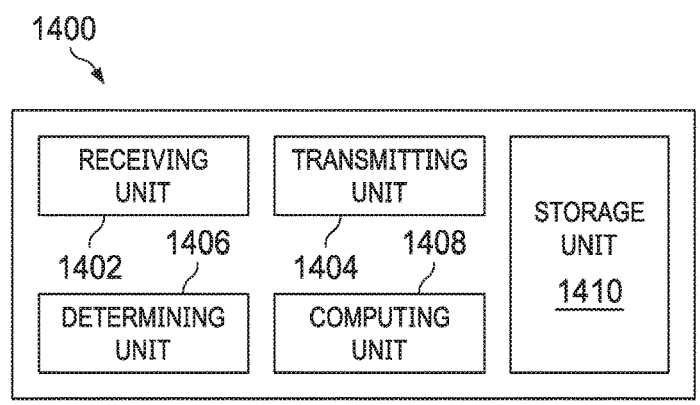
FIG. 14 is a schematic diagram illustrating an example structure of a router described in the present disclosure, according to an implementation.

FIG. 14 is a schematic diagram illustrating an example structure 1400 of a router described in the present disclosure, according to an implementation. The router 400 in FIG. 4 can be implemented by the structure 1400. The structure 1400 includes a receiving unit 1402, a transmitting unit 1404, a determining unit 1406, a computing unit 1408, and a storage unit 1410.

The receiving unit 1402 is configured to receive a data request message. The data request message includes at least a name of targeted data, a name of low-level data, and an SML for generating the targeted data using the low-level data. The data request message can be received from another router or an application.

The storage unit 1410 is configured to store data.

The determining unit 1406 is configured to determine that the targeted data is not stored in the storage unit 1410 and that the low-level data is stored in the storage unit 1410.

The computing unit 1408 is configured to compute the targeted data using the low-level data based on the SML in the data request message, in response to determining that the targeted data is not stored in the storage unit 1410 and that the low-level data is stored in the storage unit 1410.

The determining unit 1406 is also configured to determine a data response message. The data response message includes the generated targeted data.

The transmitting unit 1404 is configured to send the data response message. The data response message can be sent to another router or an application.

In some implementations, the receiving unit 1402, the transmitting unit 1404, and the determining unit 1406 can be included the message processing component 402. The computing unit 1408 can include the computation engine 408. The storage unit 1410 can include the CS 412. The storage unit 1410 can also include the PIT 414, the FIB 416, and the SML collection 406.

Described implementations of the subject matter can include one or more features, alone or in combination.

For example, in a first implementation, a method for performing semantic mashup comprising: receiving, at a router, a data request message, wherein the data request message includes at least a name of targeted data, a name of low-level data, and a semantic mashup logic for generating the targeted data using the low-level data; determining, by the router, that the targeted data is not stored at the router and that the low-level data is stored at the router; in response to determining that the targeted data is not stored at the router and that the low-level data is stored at the router, generating, by the router, the targeted data using the low-level data based on the semantic mashup logic; and generating, by the router, a data response message, the data response message including the generated targeted data.

The foregoing and other described implementations can each, optionally, include one or more of the following features:

A first feature, combinable with any of the following features, the method further comprising: receiving a second data request message, wherein the second data request message includes at least a name of second targeted data, a name of second low-level data, a second semantic mashup logic for generating the second targeted data based on the second low-level data; determining that the second targeted data and the second low-level data are not stored at the router, that the name of the second targeted data and the name of the second low-level data are not presented in a PIT, that the name of the second targeted data is not presented in a data routing table, and that the name of the second low-level data is presented in the data routing table; and in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table: generating a new data request message including at least the name of the second low-level data and an identification of the second data request message; generating a PIT entry, the PIT entry including at least the name of the second targeted data, the identification of the second data request message, and an identification of the new data request message; and including the PIT entry in the PIT.

A second feature, combinable with any of the previous or following features, the method further comprising: receiving a second data response message, the second data response message including at least the identification of the second data request message, the identification of the new data request message, and the second low-level data; determining that the identification of the new data request message in the second data response message matches the identification of the new data request message in the PIT entry, and that the identification of the second data request message in the second data response message matches the identification of the second data request message in the PIT entry; and in response to determining that the identification of the new data request message in the second data response message matches the identification of the new data request message in the PIT entry, and that the identification of the second data request message in the second data response message matches the identification of the second data request message in the PIT entry, removing the PIT entry from the PIT.

A third feature, combinable with any of the previous or following features, the method further comprising: based on the second semantic mashup logic, generating the second targeted data using the second low-level data received in the second data response message; and generating a third data response message, the third data response message including the second targeted data.

A fourth feature, combinable with any of the previous or following features, the method further comprising storing the targeted data at the router.

A fifth feature, combinable with any of the previous or following features, the method further comprising storing the semantic mashup logic at the router.

A sixth feature, combinable with any of the previous or following features, wherein the semantic mashup logic includes a mathematical formula for generating the targeted data using the low-level data.

A seventh feature, combinable with any of the previous or following features, wherein the data routing table and the PIT are stored at the router.

In a second implementation, a router, comprising: a memory storage comprising instructions; and one or more hardware processors in communication with the memory storage, wherein the one or more hardware processors execute the instructions to: receive a data request message, wherein the data request message includes at least a name of targeted data, a name of low-level data, and a semantic mashup logic for generating the targeted data using the low-level data; determine that the targeted data is not stored at the router and that the low-level data is stored at the router; in response to determining that the targeted data is not stored at the router and that the low-level data is stored at the router, generate the targeted data using the low-level data based on the semantic mashup logic; and generate a data response message, the data response message including the generated targeted data.

The foregoing and other described implementations can each, optionally, include one or more of the following features:

A first feature, combinable with any of the following features, wherein the one or more hardware processors further execute the instructions to: receive a second data request message, wherein the second data request message includes at least a name of second targeted data, a name of second low-level data, a second semantic mashup logic for generating the second targeted data based on the second low-level data; determine that the second targeted data and the second low-level data are not stored at the router, that the name of the second targeted data and the name of the second low-level data are not presented in a PIT, that the name of the second targeted data is not presented in a data routing table, and that the name of the second low-level data is presented in the data routing table; and in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table: generate a new data request message including at least the name of the second low-level data and an identification of the second data request message; generate a PIT entry, the PIT entry including at least the name of the second targeted data, the identification of the second data request message, and an identification of the new data request message; and include the PIT entry in the PIT.

A second feature, combinable with any of the previous or following features, wherein the one or more hardware processors further execute the instructions to: receive a second data response message, the second data response message including at least the identification of the second data request message, the identification of the new data request message, and the second low-level data; determine that the identification of the new data request message in the second data response message matches the identification of the new data request message in the PIT entry, and that the identification of the second data request message in the second data response message matches the identification of the second data request message in the PIT entry; and in response to determining that the identification of the new data request message in the second data response message matches the identification of the new data request message in the PIT entry, and that the identification of the second data request message in the second data response message matches the identification of the second data request message in the PIT entry, remove the PIT entry from the PIT.

A third feature, combinable with any of the previous or following features, wherein the one or more hardware processors further execute the instructions to: based on the second semantic mashup logic, generate the second targeted data using the second low-level data received in the second data response message; and generate a third data response message, the third data response message including the second targeted data.

A fourth feature, combinable with any of the previous or following features, wherein the one or more hardware processors further execute the instructions to store the targeted data at the router.

A fifth feature, combinable with any of the previous or following features, wherein the one or more hardware processors further execute the instructions to store the semantic mashup logic at the router.

A sixth feature, combinable with any of the previous or following features, wherein the semantic mashup logic includes a mathematical formula for generating the targeted data using the low-level data.

A seventh feature, combinable with any of the previous or following features, wherein the data routing table and the PIT are stored at the router.

In a third implementation, a non-transitory computer-readable medium storing computer instructions, that when executed by one or more hardware processors, cause the one or more hardware processors of a router to perform operations comprising: receiving a data request message, wherein the data request message includes at least a name of targeted data, a name of low-level data, and a semantic mashup logic for generating the targeted data using the low-level data; determining that the targeted data is not stored at the router and that the low-level data is stored at the router; in response to determining that the targeted data is not stored at the router and that the low-level data is stored at the router, generating the targeted data using the low-level data based on the semantic mashup logic; and generating a data response message, the data response message including the generated targeted data.

The foregoing and other described implementations can each, optionally, include one or more of the following features:

A first feature, combinable with any of the following features, wherein the operations further comprise: receiving a second data request message, wherein the second data request message includes at least a name of second targeted data, a name of second low-level data, a second semantic mashup logic for generating the second targeted data based on the second low-level data; determining that the second targeted data and the second low-level data are not stored at the router, that the name of the second targeted data and the name of the second low-level data are not presented in a PIT, that the name of the second targeted data is not presented in a data routing table, and that the name of the second low-level data is presented in the data routing table; and in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table: generating a new data request message including at least the name of the second low-level data and an identification of the second data request message; generating a PIT entry, the PIT entry including at least the name of the second targeted data, the identification of the second data request message, and an identification of the new data request message; and including the PIT entry in the PIT.

A second feature, combinable with any of the previous or following features, wherein the operations further comprise: receiving a second data response message, the second data response message including at least the identification of the second data request message, the identification of the new data request message, and the second low-level data; determining that the identification of the new data request message in the second data response message matches the identification of the new data request message in the PIT entry, and that the identification of the second data request message in the second data response message matches the identification of the second data request message in the PIT entry; and in response to determining that the identification of the new data request message in the second data response message matches the identification of the new data request message in the PIT entry, and that the identification of the second data request message in the second data response message matches the identification of the second data request message in the PIT entry, removing the PIT entry from the PIT.

A third feature, combinable with any of the previous or following features, wherein the operations further comprise: based on the second semantic mashup logic, generating the second targeted data using the second low-level data received in the second data response message; and generating a third data response message, the third data response message including the second targeted data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresh-olds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for performing semantic mashup, comprising:
    receiving, at a router, a data request message, wherein the data request message includes at least a name of targeted data, a name of low-level data, and a semantic mashup logic for generating the targeted data using the low-level data;
    determining, by the router, that the targeted data is not stored at the router and that the low-level data is stored at the router;
    in response to determining that the targeted data is not stored at the router and that the low-level data is stored at the router, generating, by the router, the targeted data using the low-level data based on the semantic mashup logic; and
    generating, by the router, a data response message, the data response message including the generated targeted data.

2. The method of claim 1, further comprising:
    receiving a second data request message, wherein the second data request message includes at least a name of second targeted data, a name of second low-level data, a second semantic mashup logic for generating the second targeted data based on the second low-level data;

determining that the second targeted data and the second low-level data are not stored at the router, that the name of the second targeted data and the name of the second low-level data are not presented in a pending interest table (PIT), that the name of the second targeted data is not presented in a data routing table, and that the name of the second low-level data is presented in the data routing table; and in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table:

generating a new data request message including at least the name of the second low-level data and an identification of the second data request message;

generating a PIT entry, the PIT entry including at least the name of the second targeted data, the identification of the second data request message, and an identification of the new data request message; and including the PIT entry in the PIT.

3. The method of claim 2, further comprising:

receiving a second data response message, the second data response message including at least the identification of the second data request message, the identification of the new data request message, and the second low-level data;

determining that the identification of the new data request message in the second data response message matches the identification of the new data request message in the PIT entry, and that the identification of the second data request message in the second data response message matches the identification of the second data request message in the PIT entry; and in response to determining that the identification of the new data request message in the second data response message matches the identification of the new data request message in the PIT entry, and that the identification of the second data request message in the second data response message matches the identification of the second data request message in the PIT entry, removing the PIT entry from the PIT.

4. The method of claim 3, further comprising:

based on the second semantic mashup logic, generating the second targeted data using the second low-level data received in the second data response message; and generating a third data response message, the third data response message including the second targeted data.

5. The method of claim 1, further comprising storing the targeted data at the router.

6. The method of claim 1, further comprising storing the semantic mashup logic at the router.

7. The method of claim 1, wherein the semantic mashup logic includes a mathematical formula for generating the targeted data using the low-level data.

8. The method of claim 2, wherein the data routing table and the PIT are stored at the router.

9. A router, comprising:

a memory storage comprising instructions; and one or more hardware processors in communication with the memory storage, wherein the one or more hardware processors execute the instructions to:

receive a data request message, wherein the data request message includes at least a name of targeted data, a name of low-level data, and a semantic mashup logic for generating the targeted data using the low-level data;

determine that the targeted data is not stored at the router and that the low-level data is stored at the router;

in response to determining that the targeted data is not stored at the router and that the low-level data is stored at the router, generate the targeted data using the low-level data based on the semantic mashup logic; and generate a data response message, the data response message including the generated targeted data.

10. The router of claim 9, wherein the one or more hardware processors further execute the instructions to:

receive a second data request message, wherein the second data request message includes at least a name of second targeted data, a name of second low-level data, a second semantic mashup logic for generating the second targeted data based on the second low-level data;

determine that the second targeted data and the second low-level data are not stored at the router, that the name of the second targeted data and the name of the second low-level data are not presented in a pending interest table (PIT), that the name of the second targeted data is not presented in a data routing table, and that the name of the second low-level data is presented in the data routing table; and in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table:

generate a new data request message including at least the name of the second low-level data and an identification of the second data request message;

generate a PIT entry, the PIT entry including at least the name of the second targeted data, the identification of the second data request message, and an identification of the new data request message; and include the PIT entry in the PIT.

11. The router of claim 10, wherein the one or more hardware processors further execute the instructions to:

receive a second data response message, the second data response message including at least the identification of the second data request message, the identification of the new data request message, and the second low-level data;

determine that the identification of the new data request message in the second data response message matches the identification of the new data request message in the PIT entry, and that the identification of the second data request message in the second data response message matches the identification of the second data request message in the PIT entry; and in response to determining that the identification of the new data request message in the second data response message matches the identification of the new data request message in the PIT entry, and that the identification of the second data request message in the second data response message matches the identification of the second data request message in the PIT entry, remove the PIT entry from the PIT.

12. The router of claim 11, wherein the one or more hardware processors further execute the instructions to:
based on the second semantic mashup logic, generate the second targeted data using the second low-level data received in the second data response message; and
generate a third data response message, the third data response message including the second targeted data.

13. The router of claim 9, wherein the one or more hardware processors further execute the instructions to store the targeted data at the router.

14. The router of claim 9, wherein the one or more hardware processors further execute the instructions to store the semantic mashup logic at the router.

15. The router of claim 9, wherein the semantic mashup logic includes a mathematical formula for generating the targeted data using the low-level data.

16. The router of claim 10, wherein the data routing table and the PIT are stored at the router.

17. A non-transitory computer-readable medium storing computer instructions, that when executed by one or more hardware processors, cause the one or more hardware processors of a router to perform operations comprising:
receiving a data request message, wherein the data request message includes at least a name of targeted data, a name of low-level data, and a semantic mashup logic for generating the targeted data using the low-level data;
determining that the targeted data is not stored at the router and that the low-level data is stored at the router;
in response to determining that the targeted data is not stored at the router and that the low-level data is stored at the router, generating the targeted data using the low-level data based on the semantic mashup logic; and
generating a data response message, the data response message including the generated targeted data.

18. The non-transitory computer-readable medium of claim 17, wherein the operations further comprise:
receiving a second data request message, wherein the second data request message includes at least a name of second targeted data, a name of second low-level data, a second semantic mashup logic for generating the second targeted data based on the second low-level data;
determining that the second targeted data and the second low-level data are not stored at the router, that the name of the second targeted data and the name of the second low-level data are not presented in a pending interest table (PIT), that the name of the second targeted data is not presented in a data routing table, and that the name of the second low-level data is presented in the data routing table; and
in response to determining that the second targeted data and the second low-level data are not stored at the router, that the name of the second targeted data and the name of the second low-level data are not presented in the PIT, that the name of the second targeted data is not presented in the data routing table, and that the name of the second low-level data is presented in the data routing table:
generating a new data request message including at least the name of the second low-level data and an identification of the second data request message;
generating a PIT entry, the PIT entry including at least the name of the second targeted data, the identification of the second data request message, and an identification of the new data request message; and including the PIT entry in the PIT.

19. The non-transitory computer-readable medium of claim 18, wherein the operations further comprise:
receiving a second data response message, the second data response message including at least the identification of the second data request message, the identification of the new data request message, and the second low-level data;
determining that the identification of the new data request message in the second data response message matches the identification of the new data request message in the PIT entry, and that the identification of the second data request message in the second data response message matches the identification of the second data request message in the PIT entry; and
in response to determining that the identification of the new data request message in the second data response message matches the identification of the new data request message in the PIT entry, and that the identification of the second data request message in the second data response message matches the identification of the second data request message in the PIT entry, removing the PIT entry from the PIT.

20. The non-transitory computer-readable medium of claim 19, wherein the operations further comprise:
based on the second semantic mashup logic, generating the second targeted data using the second low-level data received in the second data response message; and
generating a third data response message, the third data response message including the second targeted data.

* * * * *